US010531738B2

(12) United States Patent
Schmitz et al.

(10) Patent No.: US 10,531,738 B2
(45) Date of Patent: Jan. 14, 2020

(54) MECHANICAL ASSEMBLY FOR A CHAIR AND CHAIR WITH SUCH A MECHANICAL ASSEMBLY

(71) Applicants: Johann Burkhard Schmitz, Berlin (DE); Carola Zwick, Berlin (DE); Roland Zwick, Berlin (DE)

(72) Inventors: Johann Burkhard Schmitz, Berlin (DE); Carola Zwick, Berlin (DE); Roland Zwick, Berlin (DE)

(73) Assignee: HERMAN MILLER, INC., Zeeland, MI (US)

( * ) Notice: Subject to any disclaimer, the term of this patent is extended or adjusted under 35 U.S.C. 154(b) by 113 days.

(21) Appl. No.: 15/565,495

(22) PCT Filed: Mar. 14, 2016

(86) PCT No.: PCT/EP2016/055450
§ 371 (c)(1),
(2) Date: Oct. 10, 2017

(87) PCT Pub. No.: WO2016/146582
PCT Pub. Date: Sep. 22, 2016

(65) Prior Publication Data
US 2018/0153306 A1    Jun. 7, 2018

(30) Foreign Application Priority Data

Mar. 14, 2015  (DE) .................. 10 2015 003 156
Nov. 13, 2015  (DE) .................. 10 2015 119 689

(51) Int. Cl.
*A47C 1/03* (2006.01)
*A47C 1/0355* (2013.01)
(Continued)

(52) U.S. Cl.
CPC .......... *A47C 1/0355* (2013.01); *A47C 1/0352* (2013.01); *A47C 31/126* (2013.01); *F16H 19/04* (2013.01)

(58) Field of Classification Search
CPC ... A47C 1/0355; A47C 1/03255; A47C 1/035; A47C 1/03277; A47C 1/0352;
(Continued)

(56) References Cited

U.S. PATENT DOCUMENTS 2,818,911 A    1/1958  Syak
3,369,840 A    2/1968  Dufton
(Continued)

FOREIGN PATENT DOCUMENTS

AU    783829 B2    4/2002
DE    3700447 A1    1/1987
(Continued)

OTHER PUBLICATIONS

International Search Report and Written Opinion for Application No. PCT/EP2017/056001 dated May 31, 2017 (16 ppages including English translation).

(Continued)

*Primary Examiner* — Mark R Wendell
(74) *Attorney, Agent, or Firm* — Michael Best & Friedrich LLP

(57) ABSTRACT

The invention relates to a mechanical assembly (2), said mechanical assembly (2) comprising, in addition to a leaf spring, at least one further spring element, the elastic restoring force of the at least one further spring element and the elastic restoring force of the one or more leaf springs supporting the seat shell (S) with a total restoring force, and/or the mechanical assembly (2) comprising at least two leaf springs and at least two supports, each support being associated with one of the leaf springs, and at least two
(Continued)

supports being displaceable beneath the leaf springs by means of an adjustment mechanism and being displaceable on their trajectories by different extents.

18 Claims, 31 Drawing Sheets

(51) Int. Cl.
    *A47C 31/12*     (2006.01)
    *A47C 1/035*     (2006.01)
    *F16H 19/04*     (2006.01)

(58) Field of Classification Search
    CPC ..... A47C 1/03294; A47C 3/025; A47C 3/026; A47C 7/445; A47C 31/126; F16H 19/04
    USPC .......................................................... 297/88
    See application file for complete search history.

(56) References Cited

U.S. PATENT DOCUMENTS

| | | | |
|---|---|---|---|
| 4,765,679 A | 8/1988 | Lanuzzi et al. | |
| 4,911,501 A | 3/1990 | Decker et al. | |
| 5,080,318 A | 1/1992 | Takamatsu et al. | |
| 5,224,758 A * | 7/1993 | Takamatsu | A47C 3/026 297/300.5 |
| 5,348,372 A | 9/1994 | Takamatsu et al. | |
| 6,250,715 B1 | 6/2001 | Caruso et al. | |
| 7,273,253 B2 | 9/2007 | Deimen et al. | |
| 7,513,569 B2 | 4/2009 | Curiger | |
| 7,625,045 B2 | 12/2009 | Hatcher et al. | |
| 7,784,870 B2 | 8/2010 | Machael et al. | |
| 7,857,390 B2 * | 12/2010 | Schmitz | A47C 1/03255 297/300.1 |
| 7,992,937 B2 | 8/2011 | Plikat et al. | |
| 8,025,334 B2 | 9/2011 | Schmitz et al. | |
| 8,146,990 B2 | 4/2012 | Bock | |
| 2005/0275265 A1 * | 12/2005 | Deimen | A47C 1/03222 297/316 |
| 2006/0006715 A1 * | 1/2006 | Chadwick | A47C 1/03255 297/300.4 |
| 2006/0202530 A1 | 9/2006 | Lin | |
| 2008/0088163 A1 | 4/2008 | Sander et al. | |
| 2009/0079238 A1 | 3/2009 | Plikat et al. | |
| 2009/0146476 A1 * | 6/2009 | Kan | A47C 1/03255 297/284.4 |
| 2009/0261637 A1 | 10/2009 | Schmitz et al. | |
| 2009/0267394 A1 * | 10/2009 | Bock | A47C 1/03255 297/300.2 |
| 2010/0141002 A1 | 6/2010 | Kurrasch et al. | |
| 2012/0002557 A1 | 1/2012 | Sedler et al. | |
| 2013/0169017 A1 | 7/2013 | Masunaga et al. | |
| 2015/0123441 A1 * | 5/2015 | Duke | A47C 1/03255 297/300.4 |
| 2016/0100691 A1 | 4/2016 | Masunaga et al. | |
| 2016/0227935 A1 | 8/2016 | DeJule et al. | |
| 2019/0038033 A1 | 2/2019 | Schmitz et al. | |

FOREIGN PATENT DOCUMENTS

| | | |
|---|---|---|
| DE | 4208648 C1 | 5/1993 |
| DE | 102013005861 A1 | 10/2014 |
| WO | 2007110732 A2 | 10/2007 |
| WO | 2016146582 A2 | 9/2016 |

OTHER PUBLICATIONS

English translation of International Search Report and Written Opinion for Application No. PCT/EP2016/055450 dated Oct. 5, 2016 (12 pages).

* cited by examiner

MECHANICAL ASSEMBLY FOR A CHAIR AND CHAIR WITH SUCH A MECHANICAL ASSEMBLY

The invention relates to a mechanical assembly for a chair, and to a chair having a mechanical assembly of this type.

A mechanical assembly for a chair, or a chair having a mechanical assembly of this type, respectively, is known from WO 2007/110732 A2. FIGS. 2a and 2b therein disclose a mechanical assembly for a chair, wherein a foot element, a back element, and a seat element are articulatable on the mechanical assembly, wherein the back element and the seat element form a seat shell, wherein the mechanical assembly comprises a support, a front swing arm, and a rear swing arm, wherein the front swing arm is pivotably articulated on the support and connected to the seat element, wherein the rear swing arm is pivotably articulated on the support and connected to the seat shell, wherein the mechanical assembly, in order to compensate for a body weight of a person seated, comprises at least one leaf spring, wherein the mechanical assembly furthermore comprises at least one adjustable bearing, an adjustment mechanism for the bearing or the bearings, respectively, and at least one raceway for the bearing or the bearings, respectively, wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region.

It is an object of the invention to propose a mechanical assembly for a chair, or a chair having a mechanical assembly of this type, respectively, by way of which improved, in particular more responsive or more free-moving tuning or adapting to the body weight of a person is made possible.

The mechanical assembly according to the invention is configured in such a manner that it

- either comprises at least one further spring element, wherein the elastic restoring force of the at least one further spring element and the elastic restoring force of the leaf spring or the leaf springs supports the seat shell by way of a total restoring force;
- or comprises at least two of the leaf springs and at least two of the bearings (13, 14), wherein each bearing is assigned to one of the leaf springs, wherein at least two of the bearings are displaceable below the leaf springs by way of the adjustment mechanism and are displaceable on the raceway or raceways in particular by identical or variable paths;
- or comprises both at least one further spring element, wherein the elastic restoring force of the at least one further spring element and the elastic restoring force of the leaf spring or the leaf springs supports the seat shell by way of a total restoring force, as well as at least two of the leaf springs and at least two of the bearings, wherein each bearing is assigned to one of the leaf springs, wherein at least two of the bearings are displaceable below the leaf springs by way of the adjustment mechanism and are displaceable on the raceway or raceways in particular by identical or variable paths.

On account of the at least one further spring element which is employed in addition to the leaf spring or leaf springs, respectively, which is or are, respectively, supported by the displaceable bearing or the displaceable bearings, respectively, it is possible to achieve improved tuning to the body weight of a person, since the weight of a very light person weighing, for example, only 30 kg is initially able to be absorbed only by a fixed pre-setting of the further spring element or the further spring elements, respectively, such that lower pre-tensioning of the adjustable leaf spring or leaf springs, respectively, is required and an adjustment is thus performed under lower pre-tensioning and thus in a more free-moving manner, and also more sensitive tuning is thus made possible.

On account of an embodiment of the mechanical assembly that allows the bearings to be displaceable by variable paths below the leaf springs by way of the adjustment mechanism, improved tuning to the body weight of a person is likewise enabled, since the total restoring force may be adjusted in more precise steps.

The construction is simplified on account of a mechanical assembly in the case of which additional supporting of the seat shell is performed by the at least one further spring element and in the case of which the bearings are displaceable by variable path lengths below the leaf springs by way of the adjustment mechanism, since the bearings can be connected, stabilize one another on account thereof, and are guided in a more free-moving manner.

On account of an embodiment of the mechanical assembly corresponding to both of the previously mentioned design embodiments, both free movement and fine adjustability may be achieved, such that improved tuning to the body weight of a person is achieved to a particular degree.

Alternatively, it is also provided that the mechanical assembly according to the invention is configured in such a manner that the adjustment mechanism for the bearing or for the bearings, respectively, comprises at least one belt drive, wherein the belt drive or belt drives, respectively, is/are driven by a drive and is/are disposed between the drive and the bearing or the bearings, respectively. On account of the use of at least one belt drive, precise, free-moving, silent and low-maintenance displacement of the bearings is possible. The precision is achieved in particular in that the belt drive has little play.

It is furthermore provided that the front swing arm is configured as an H-shaped bracket with four legs, wherein the bracket on the first and the second leg is fastened to the support so as to be pivotable about a common rotation axis, and wherein the seat element is articulated on the third and the fourth leg so as to be pivotable about a common rotation axis. On account of a configuration of this type it is possible for a free-moving connection with little play to be established between the support and the seat element, since linking of the four articulation points is obtained by a cross brace which connects the legs.

It is also provided that the rear swing arm is configured as an H-shaped bracket with four legs, wherein the bracket on the first and the second leg is fastened to the support so as to be pivotable about a common rotation axis, wherein the seat element is articulated on the third and the fourth leg so as to be pivotable about a common rotation axis, and wherein an appendage of the third and fourth leg is connected to the back element and supports the latter. On account of a configuration of this type it is again possible for a free-moving connection with little play to be established between the support and the seat element, since linking of the four articulation points is obtained by a cross brace which connects the legs. This four-point bearing also allows support of the back rest which is immune to lateral forces, such that the back rest is stabilized on account of this support and thus shifting of the chair by way of its back rest is possible without the chair performing evasive movements which impede shifting.

It is also provided that the support is directly connected to the foot element. On account thereof, no further components are required in addition to the support for interfacing with the foot element, and the mechanical assembly remains particularly simple and thus cost-effective.

According to a first variant, it is provided that the adjustment mechanism is equipped with a drive which in particular is configured as a manual drive or as an electric drive, a first transmission with a first gear ratio, in particular a first reduction gearing or positive gearing, respectively, and a second transmission with a second gear ratio, in particular a second reduction gearing or positive gearing, respectively, that is different from the first reduction gearing or positive gearing, respectively, wherein both transmissions are driveable by the drive, and wherein the first bearing is driveable by the first transmission and the second bearing is driveable by the second transmission. By selecting two gear ratios, in particular reduction gearings or positive gearings, respectively, which differ by the factor 2, for example, the mechanical assembly in this way may be set in a more responsive manner.

According to a second variant, it is also provided that the adjustment mechanism is equipped with a first drive which in particular is configured as a manual drive or as an electric drive, a second manual drive which in particular is configured as a manual drive or as an electric drive, a first transmission and a second transmission, wherein the first transmission is driveable by the first drive, and wherein the second transmission is driveable by the second drive. This offers the possibility of implementing coarse setting by way of one drive and fine setting by way of a second drive.

According to a third variant, it is provided that the adjustment mechanism is equipped with a drive which in particular is configured as a manual drive or as an electric drive, a clutch and a transmission, wherein the transmission is driveable by the drive, and wherein the first bearing in a first clutch position of the clutch is driveable by the transmission, and wherein the second bearing in a second clutch position of the clutch is driveable by the transmission. On account thereof, coarse setting and fine setting may be performed with one drive, while dispensing with a mechanical linkage.

Furthermore, it is provided that the support is indirectly connected to the foot element, wherein the mechanical assembly in addition to the support further comprises a flange, an articulation means, and a weighing means, wherein the flange is connected to the foot element, wherein the support by way of the articulation means is articulated on the flange, wherein the support by way of the weighing means is supported on the flange. On account of this construction design, a mechanical weighing action is implemented by way of which the body weight of a person seated on the chair or sitting down on the chair, respectively, is detectable.

In a complementary manner it is provided that the adjustment mechanism is equipped with a mechanical weighing action and a mechanical adjustment action, wherein the mechanical weighing action drives the mechanical adjustment action depending on the body weight of a person seated on the seat element, and the bearings, depending on the body weight of the person seated, are simultaneously displaced by the mechanical adjustment action by variable paths along their raceway in such a manner that the seat shell is supported on the support to a degree so as to correspond to the body weight of the person. To this end, the mechanical adjustment action comprises in particular a first transmission with a first gear ratio, in particular a first reduction gearing or a first positive gearing, and a second transmission with a second gear ratio, in particular a second reduction gearing or positive gearing, respectively, that is different from the first reduction gearing or positive gearing, respectively. A setting of this type is automatically performed and thus relieves the user of any setting activity.

It is provided that the weighing means is configured by at least one leaf spring. Components of this type are cost-effective and may be installed in a space-saving manner.

In terms of the articulation means which interconnects the flange and the support, it is provided that the former is equipped with two levers which are guided in parallel and which are in each case connected to the flange and the support so as to be rotatable about a total of four parallel articulation axes. An articulated connection of this type is rugged and easy to assemble and can be implemented in a space-saving manner.

Furthermore, it is provided that the seat shell, by an interconnection of the rear swing arm, is indirectly supported on the leaf spring or leaf springs, respectively, and on the further spring element or the further spring elements, respectively, the latter collectively forming a spring pack for compensating the body weight of a person seated. On account thereof, the transmission of force is transmitted to the rear swing arm, such that a direct introduction of force into the seat shell is not required.

It is also provided that the further spring element or the further spring elements, respectively, is or are, respectively, configured as a leaf spring which is or are, respectively, disposed next to the adjustable leaf springs in such a manner, wherein the additional leaf spring or the additional leaf springs, respectively, by way of a first end region is or are, respectively, likewise fixed to the support, wherein the mechanical assembly comprises stationary bearings for the further spring element or elements, respectively. An orientation of this type of the leaf springs and of the further spring elements enables a compact construction, since the rear swing arm in the case of an H-shaped embodiment may be supported on all springs of the spring pack by way of a cross brace.

It is also provided that in each case one additional leaf spring is connected to an adjustable leaf spring in the first end regions thereof, and outside the first end region said leaf springs are separated by a slot. On account thereof, it is possible to reduce the number of components while maintaining the functionality.

On account of a special embodiment of the mechanical adjustment action, particular free movement is achieved as a consequence of the use of fewer components, such that a setting which is driven by the mechanical weighing action particularly continues without the user becoming aware of the setting operation.

It is also provided that the wider leaf springs taper off towards a receptacle in which said wider leaf springs are clamped. On account thereof, and counter to expectations, the mechanical assembly can also be set in an optimal manner to the requirements of a person with a body weight of less than 60 kg.

Good adaption to the requirements set by persons with a body weight of less than 60 kg and by persons with a body weight of more than 60 kg in respect of the spring-action comfort of a mechanical assembly for a chair can surprisingly be achieved in that the wider leaf springs in terms of the width thereof in a portion adjacent to the receptacle taper off towards the receptacle and in particular in a portion that follows the adjacent portion and is remote from the receptacle have a consistent width.

It is furthermore provided that a drive is equipped with a rack which is disposed on a flange and with a gear wheel rotatably mounted on the support, wherein the support in relation to the flange is movable in such a manner that the gear wheel in the case of a movement of the support rolls on the rack. On account thereof, a substantially vertical movement that is forced upon the mechanical assembly when a person sits down on a chair that is equipped with the mechanical assembly can be converted to a rotating movement by way of a minor number of components.

It is also provided that the belt drive is equipped with a first belt pulley, a second belt pulley, a belt, and an entrainment element, wherein the first belt pulley is connected in particular to a gear wheel of a drive. The rotating movement of the gear wheel can be converted to a linear movement in a simple manner and by an interconnection of only a few components by way of a transmission of this type of simple construction.

It is furthermore provided that the drive is configured as an automatic drive, wherein a driving force for the drive is generatable in particular by a weight of a person sitting down on a chair that comprises the mechanical assembly, and/or wherein a driving force for the drive is generated in particular by the relaxing leaf spring or the relaxing leaf springs which are pretensioned by a weight of a person sitting down on a chair that comprises the mechanical assembly. An automatic operation of this type can be implemented for everyday use without setting additional requirements for a person that supplies the automatic operation with energy, since the person is not required to perform any additional movement other than the natural movement during sitting down and getting up.

It is also provided that the raceway is configured as a curved face, wherein the latter is adapted to the curved profile of the respectively assigned leaf spring, wherein a moving space that is configured between the raceway and a lower side of the leaf spring allows unimpeded displacement of the bearing between a basic position of the bearing and a terminal position of the bearing by the leaf spring as long as the rear swing arm is free of stress by a user that leans back against the back element, and wherein a spacing that is in each case measured in the radial direction between the raceway and the assigned leaf spring is consistent in the entire moving space. A free-moving displacement of the bearing or bearings, respectively, is guaranteed by an adaptation of the raceway of this type to the curved profile of the leaf spring; on account thereof it is likewise ensured that the bearing or the bearings, respectively, are always reliably displaced up to a position that corresponds to a weight of the user when the user sits down on the chair in which the mechanical assembly is installed.

Finally, according to the invention a chair which comprises a mechanical assembly according to at least one of the preceding claims, a foot element, a back element, and a seat element is provided. A chair of this type offers the advantages which have been stated above in conjunction with the mechanical assembly.

In the context of the invention, a seat shell comprises a seat element and a back element. It is provided here both that the seat shell is configured in a unipartite manner, such that the seat element is connected to the back element by way of a connection means, such as in particular at least one articulated connection or at least one elastic connection element, as well as that the seat element and the back element are only indirectly interconnected by way of the mechanical assembly.

Further details of the invention are described in the drawing by means of schematically illustrated exemplary embodiments.

Figure 1:
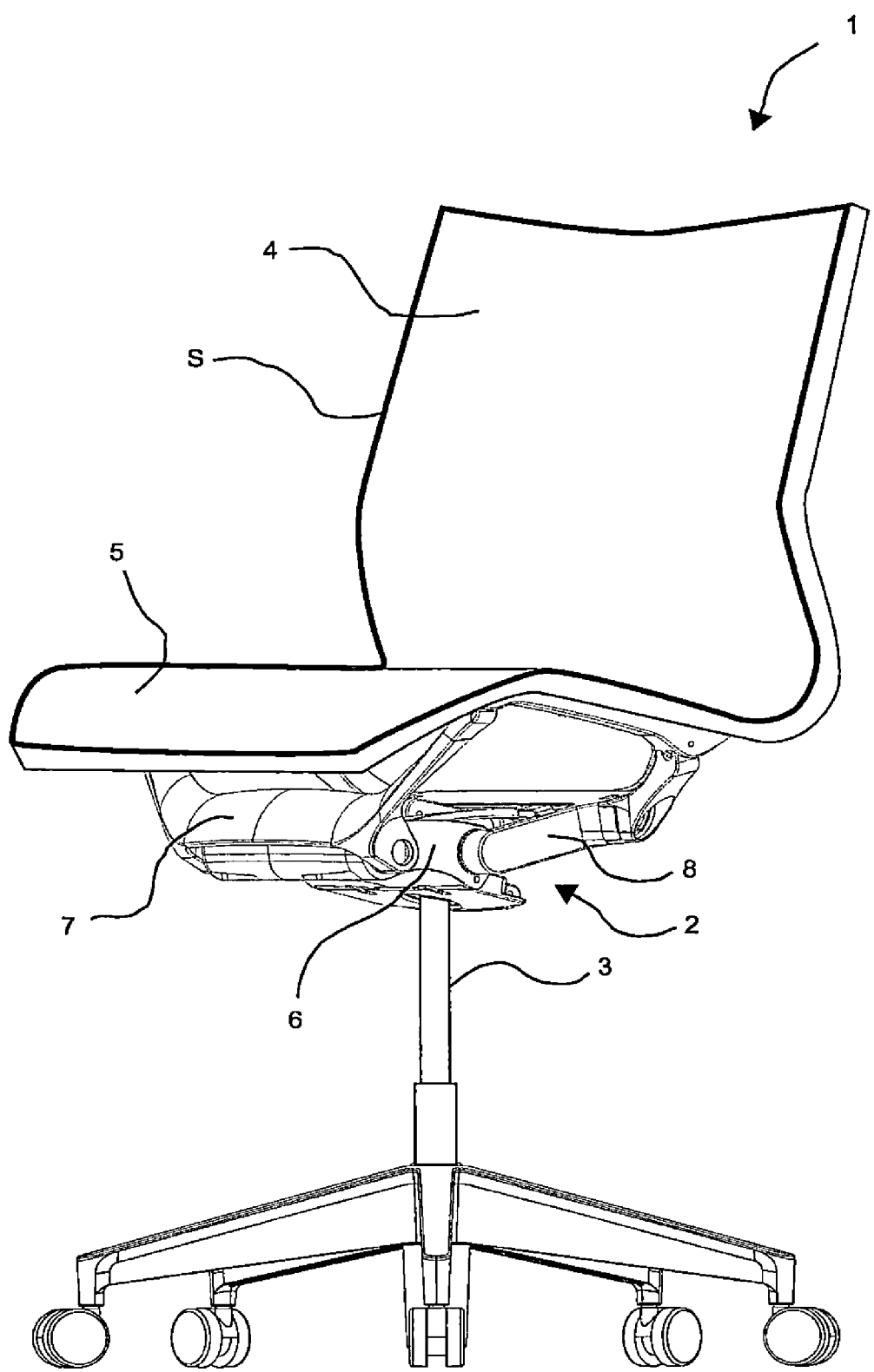
FIG. 1 shows a perspective side view of a chair according to the invention, having a mechanical assembly according to the invention.
Figure 2:
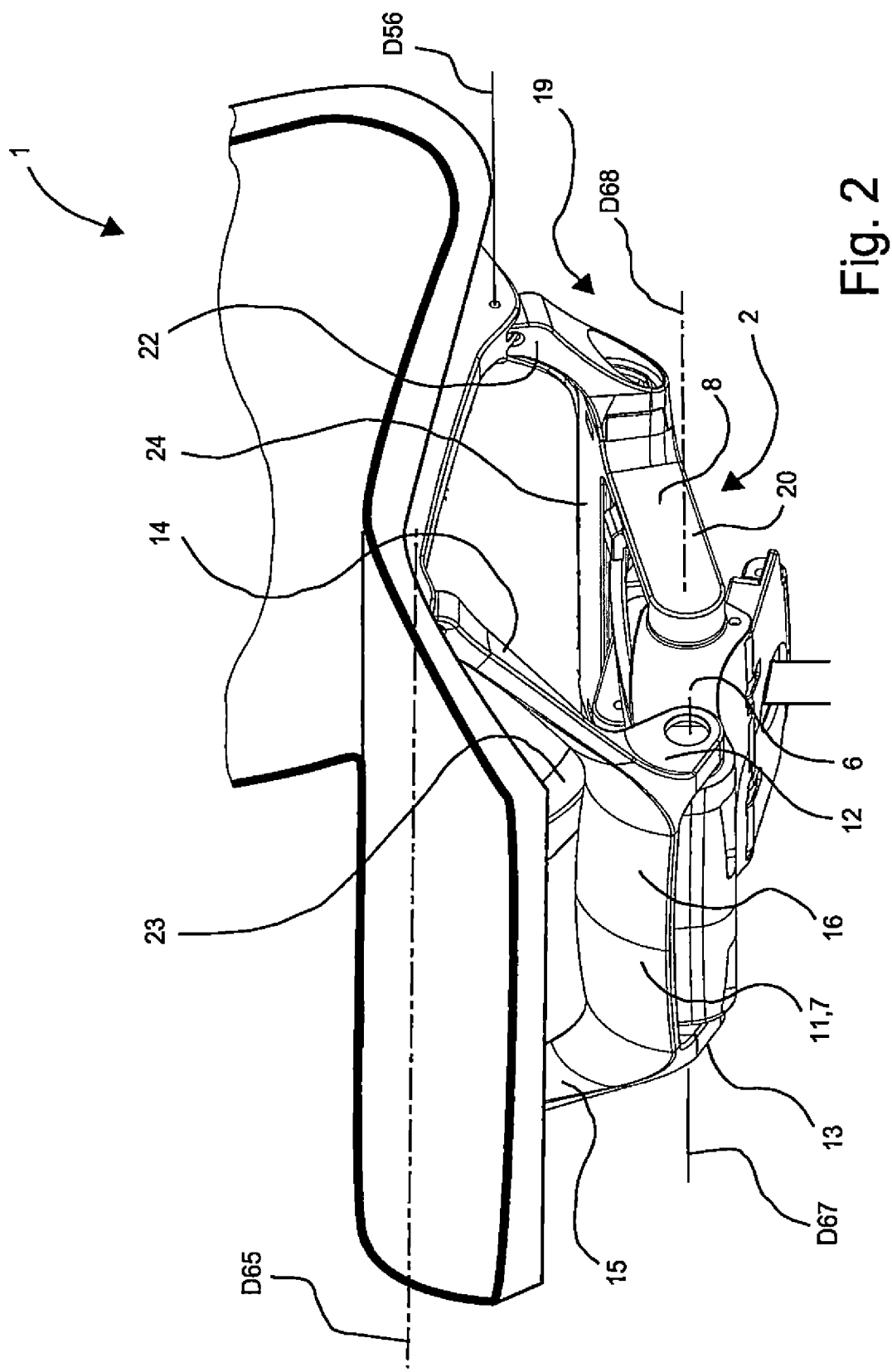
FIG. 2 shows a detailed view of FIG. 1.
Figure 3:
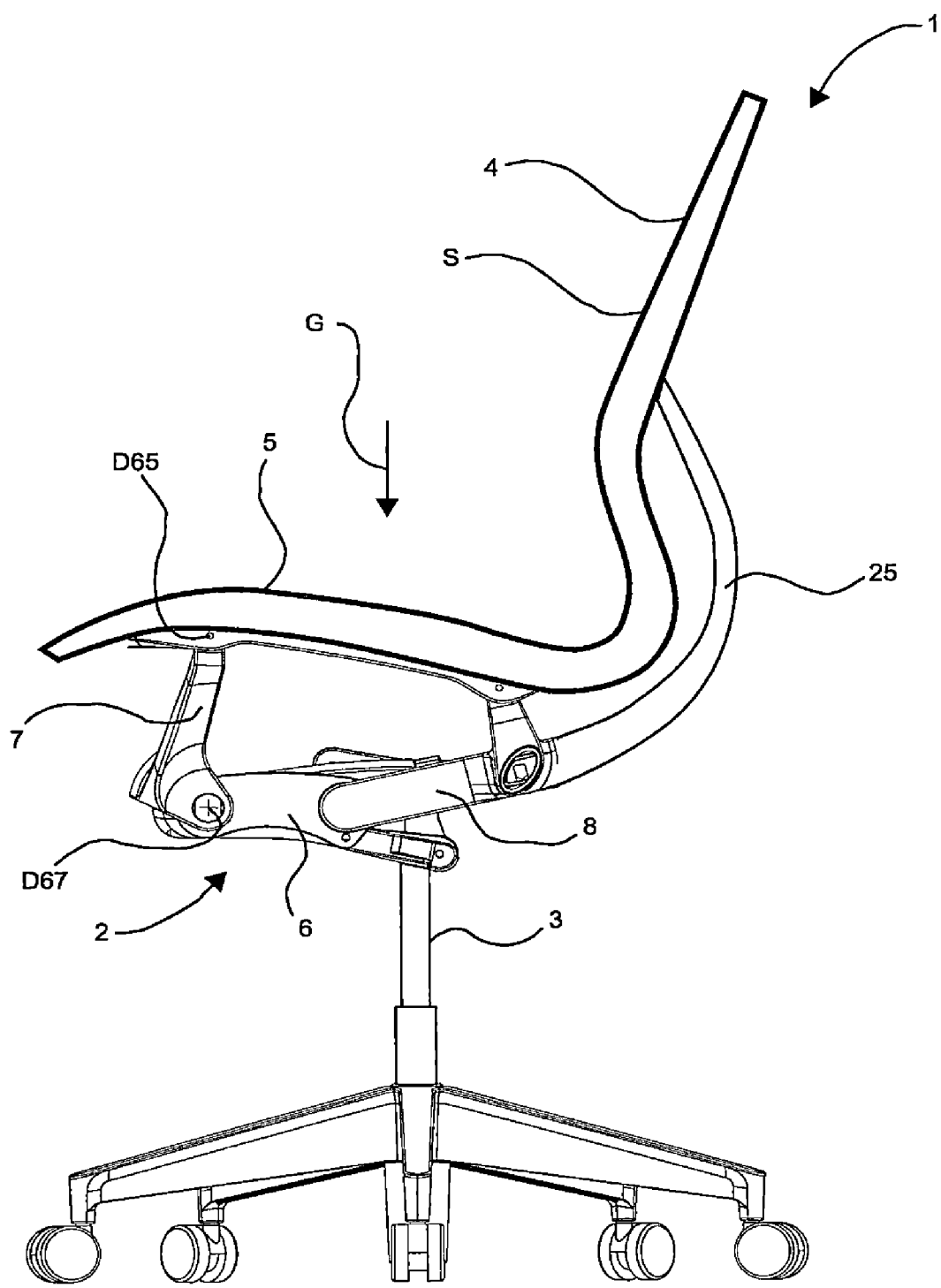
FIG. 3 shows a side view of FIG. 1.
Figure 4:
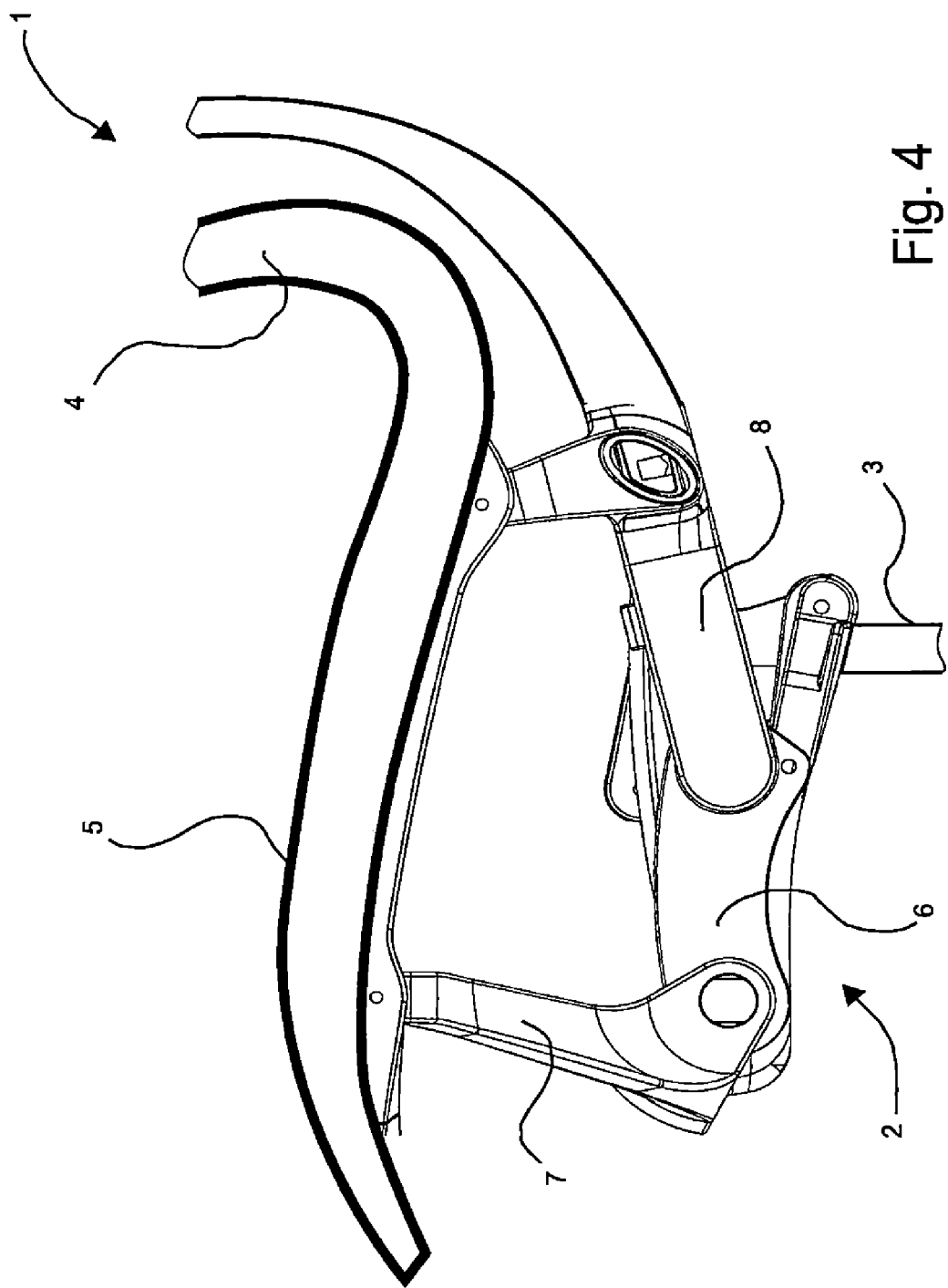
FIG. 4 shows a detailed view of FIG. 3.

A chair 1 according to the invention having a mechanical assembly 2 according to the invention is illustrated in FIG. 1 in a perspective side view. FIG. 2 shows the mechanical assembly 2. FIG. 3 shows the chair 1 which is illustrated in FIG. 1 in a side view from the right, and FIG. 4 shows the mechanical assembly 2 again in an enlarged illustration, but in the side view corresponding to FIG. 3. The mechanical assembly 2 which is known from FIGS. 1 to 4 is illustrated in FIGS. 5 to 19 in further views, wherein to some extent components have been disregarded in order to improve the illustration of individual components.

Figure 5:
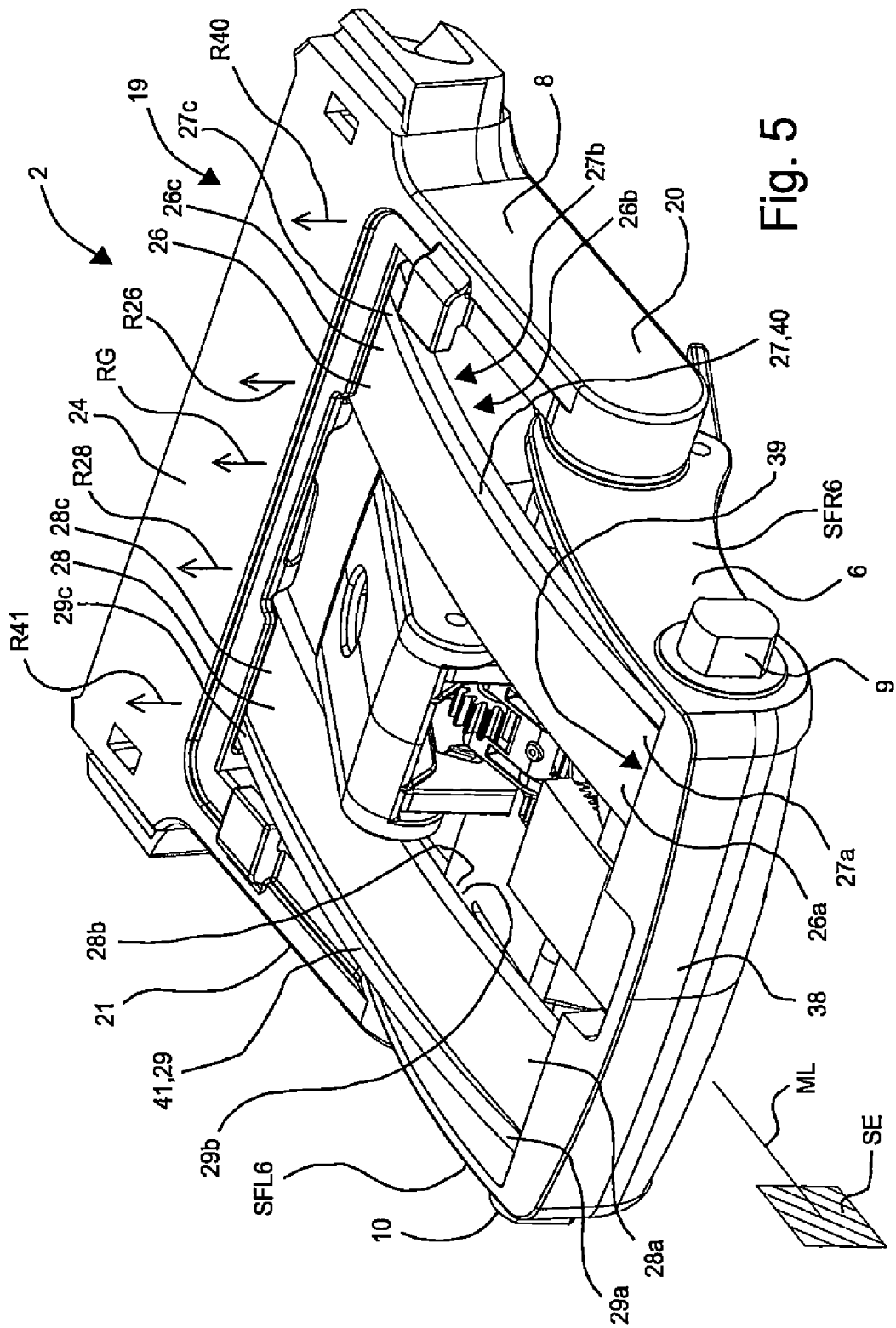
FIG. 5 shows a perspective view of the mechanical assembly of the chair.

As is shown in particular in FIGS. 1 to 6, a foot element 3, a back element 4, and a seat element 5 are articulatable on the mechanical assembly 2 for the chair 1. Here, the back element 4 and the seat element 5 form a seat shell S. The mechanical assembly 2 comprises a support 6, a front swing arm 7, which is shown only in FIGS. 1 to 4, and a rear swing arm 8 which, commencing from FIG. 5, is illustrated at best in a cut-off manner.

The front swing arm 7 is articulated on the support 6 so as to be pivotable about a rotation axis D67 and is connected to the seat element 5 so as to be pivotable about a rotation axis D65, wherein to this end axle journals 9, 10 are configured on the support 6, on a right side wall SFR6 of the support 6 and on a left side wall SFL6 of the support 6, into which axle journals 9, 10 the front swing arm 7 is dropped (cf. FIGS. 1 to 4, for example). The front swing arm 7 is configured as an H-type bracket 11 (see in particular FIG. 2) which comprises four legs 12, 13, 14, and 15, and a cross brace 16. Here, the first and the second legs 12, 13 are connected to the support 6, and the legs 14, 15 here are connected to the seat element 5.

The rear swing arm 8 (see in particular FIG. 2) is articulated on the support 6 so as to be pivotable about a rotation axis D68 and connected to the seat shell S, wherein the support 6 is connected to the seat element 5 so as to be pivotable about a rotation axis D56. To this end, axle journals 17, 18 are configured on the support 6, on the right side wall SFR6 of the support 5 and on the left side wall SFL6 of the support 6 (see FIG. 6), into which axle journals 17, 18 the rear swing arm 8 is dropped. The rear swing arm 8, like the front swing arm 7, is configured as an H-type bracket 19 (see FIGS. 2 and 5) which comprises four legs 20, 21, 22, and 23, a cross brace 24, and an appendage 25 (see FIG. 3). Here the first and the second legs 20, 21 are connected to the support 6, the legs 22, 23 here are connected to the seat element 5, and the appendage 25 here is connected to the back element 4, such that the rear swing arm 8 is connected to both the seat element 5 and the back element 4.

In order for a body weight G of a person (not illustrated) seated on the chair 1 to be compensated for, the mechanical assembly 2 comprises four leaf springs 26, 27, 28, and 29. Here, the internal leaf springs 26 and 28 which are close to a central longitudinal axis ML are configured as wide leaf springs, and the leaf springs 27 and 29 which are remote from the central longitudinal axis ML are configured as narrow leaf springs (see FIG. 5). It can be seen from FIG. 6 that in each case one contact area 31, 32 which is configured on the support 6 is assigned to the narrow leaf springs 27 and 29 on a base 30 of the support 6. On account thereof, the restoring force of the narrow leaf springs 27 and 29 is defined to a fixed value.

Figure 17:
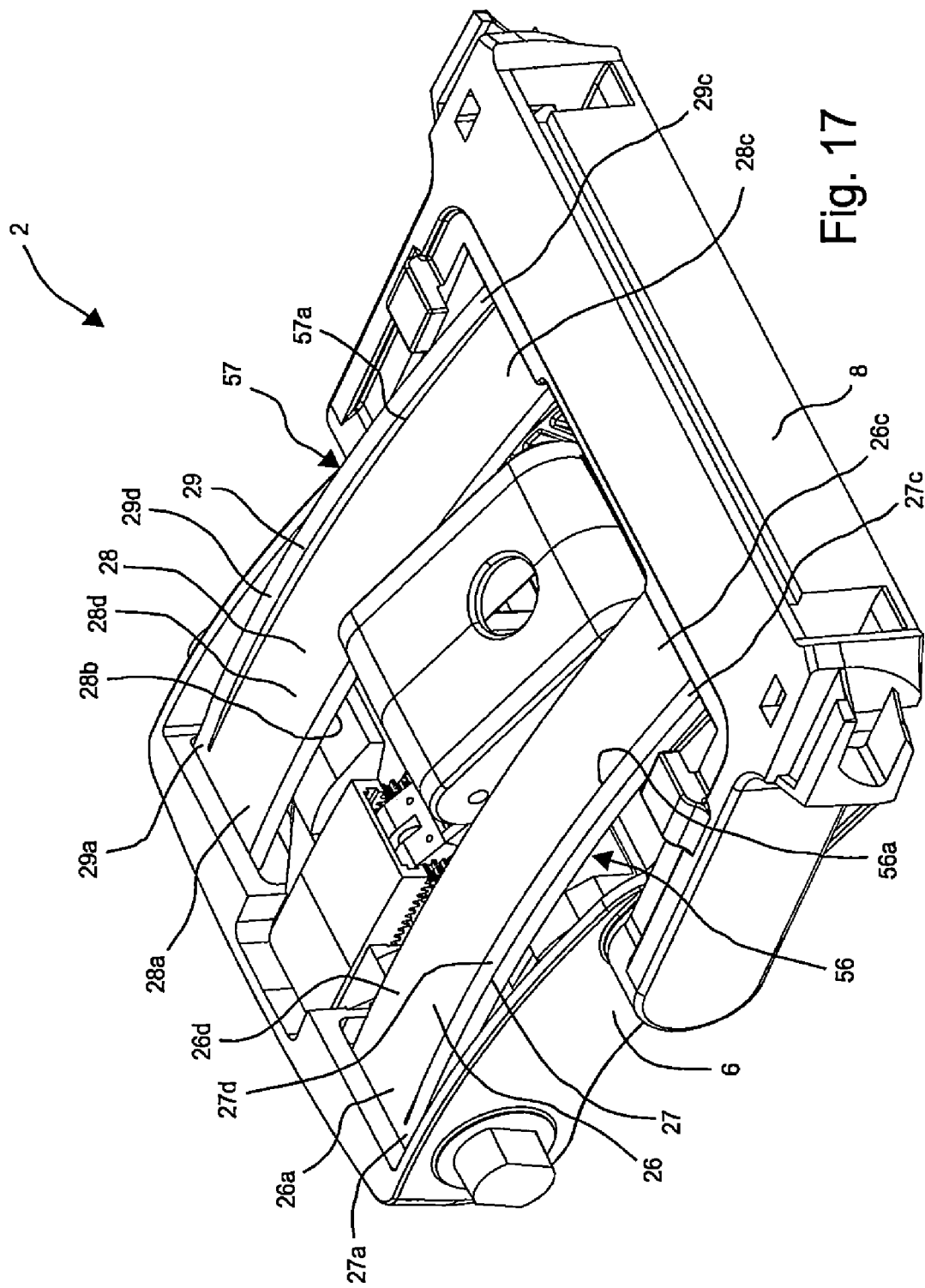
FIG. 17 shows a further perspective illustration of the mechanical assembly.
Figure 18:
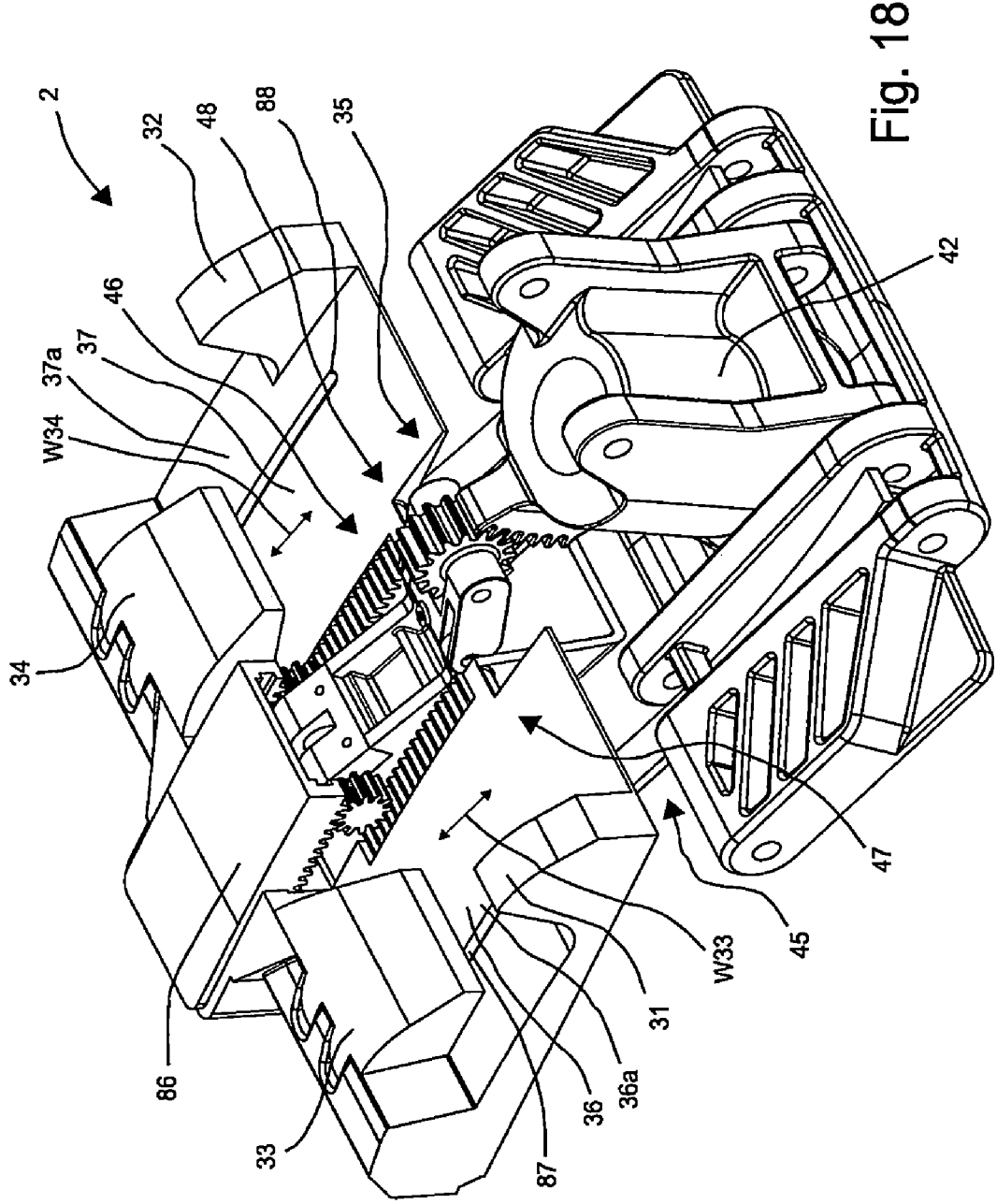
FIGS. 18 and 19 show the illustration of FIG. 17, with components partially disregarded.
Figure 30:
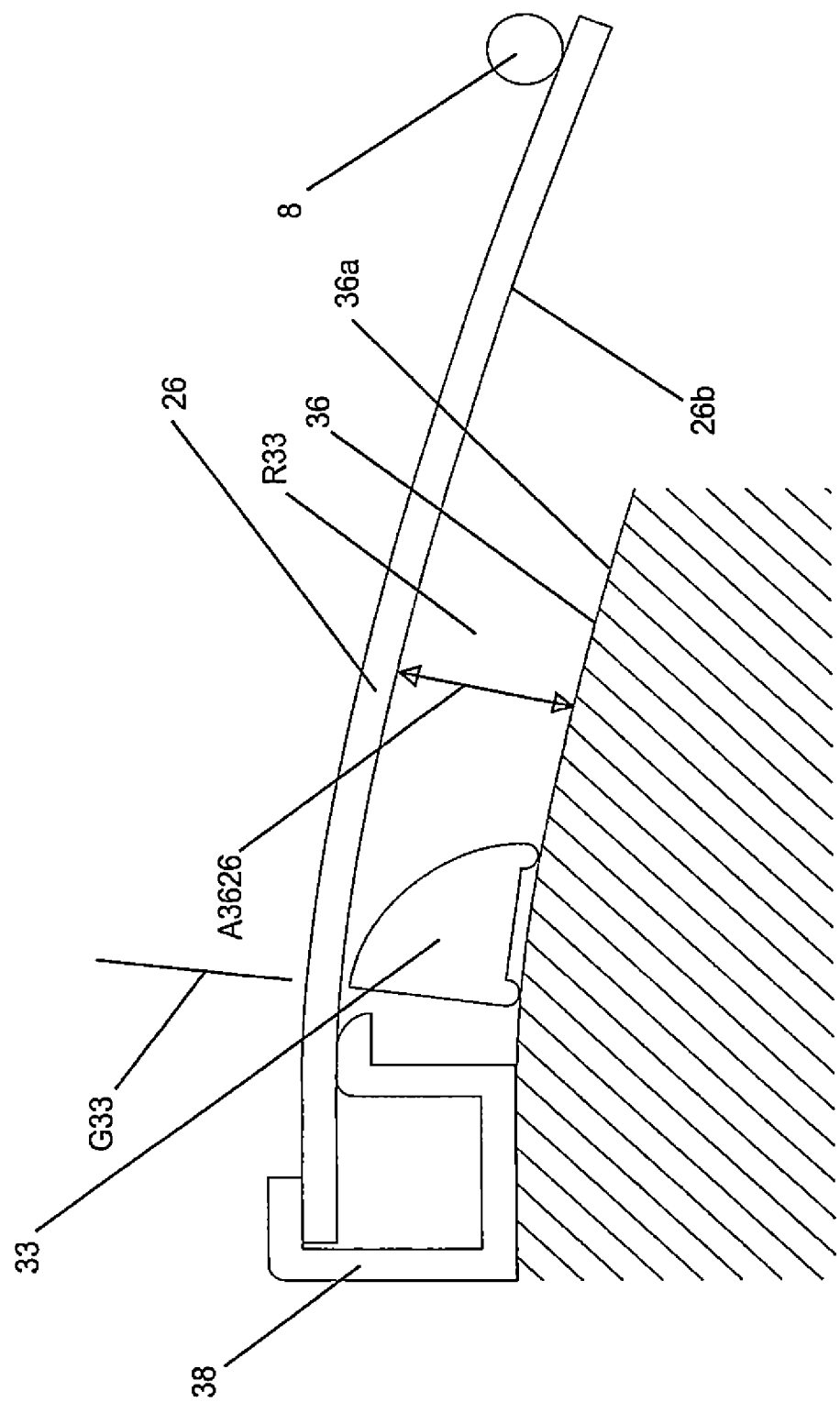
FIGS. 30, 31 show schematic illustrations for further explaining the first variant of embodiment of the mechanical assembly as shown in FIGS. 1 to 19.
Figure 31:
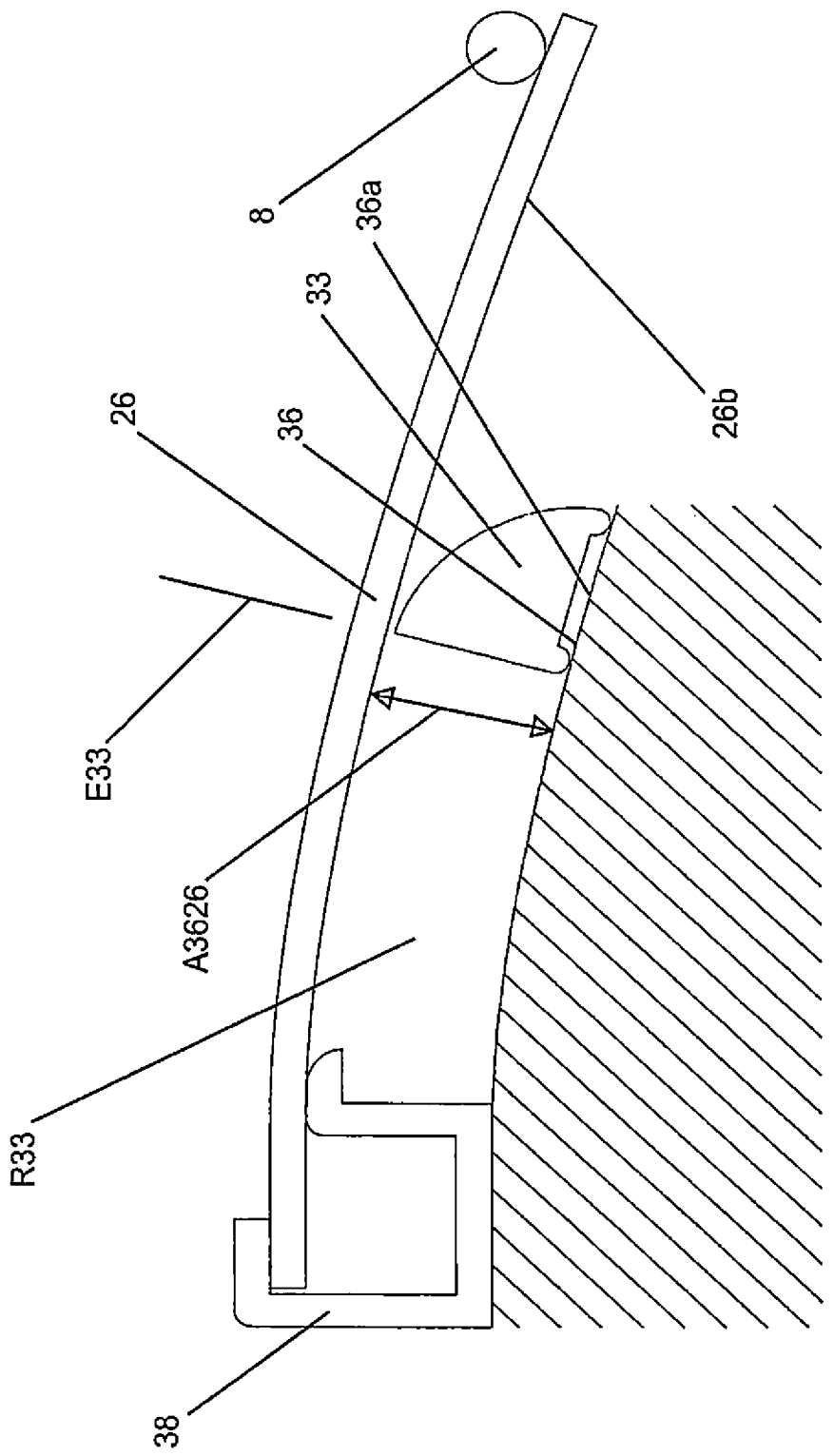

The mechanical assembly 2 comprises two adjustable bearings 33, 34, an adjustment mechanism 35 for the bearings 33, 34, and raceways 36, 37 for the bearings 33, 34 (see in particular FIG. 18). The bearings 33, 34 are interconnected while configuring a web 86 and are guided into two parallel-running guides 87, 88 (see FIG. 18). On account thereof, canting during a displacement movement is effectively precluded. The raceways 36, 37 are configured as faces 36a, 37a that are curved in the direction of the leaf springs 26 or 28, respectively. The curvature of the raceways 36 or 37, respectively, herein is adapted to the curvature which the leaf springs 26 or 28, respectively, by way of the lower side 26b or 28b, respectively, thereof have when the back element 4 is in an upright position that is unstressed by a user in such a manner that a spacing A3626 (see FIG. 30) that is measured so as to be radial to the raceway 36 or 37, respectively, in the entire moving space R33 of the bearing 33 is always approximately consistent and always of such a size that the bearing 33 or 34, respectively, can be displaced in an unimpeded manner on the raceway 36 or 37, respectively, by the leaf spring 26 or 28, respectively. To this end, reference is made to FIGS. 17 and 18 and to the diagrammatic and purely schematic FIGS. 30 and 31. The latter show a bulkhead 38, the leaf spring 26 that is fastened to the bulkhead 38, and the raceway 36. The rear swing arm 8 which is supported on the leaf spring 26 is furthermore indicated by a circle. The bearing 33 in the illustration of FIG. 30 is in a basic position G33, the former assuming said basic position G33 when the chair is unstressed. The bearing 33 in the illustration of FIG. 31 is in a terminal position E33, the former assuming said terminal position E33 when the chair is stressed by a heavy person.

Both the internal leaf springs 26, 28 as well as the external leaf springs 27, 29 (see FIG. 5) by way of a first end region 26a, 27a, 28a, 29a are fixed to the support 6 in a receptacle 39 on the bulkhead 38 which is disposed between the axle journals 9, 10.

Outside their end regions 26a, 27a, 28a, 29a the leaf springs 26, 27, 28, and 29 bear in each case by way of a lower side 26b, 27b, 28b, 29b on the respectively assigned bearing 33, 31, 34, 32 and by way of opposite end regions 26c, 27c, 28c, 29c indirectly support the seat shell S or directly support the rear swing arm 8 on the cross brace 24 thereof (see FIG. 5).

The external leaf springs 27, 29 of the mechanical assembly 2 form further spring elements 40, 41. Here, the elastic restoring force R40, R41 of the two further spring elements 40, 41, and the elastic restoring force R26, R28 of the two internal leaf springs 26, 28, add up to a total restoring force RG which by way of the swing arm 8 supports the seat shell S.

Figure 6:
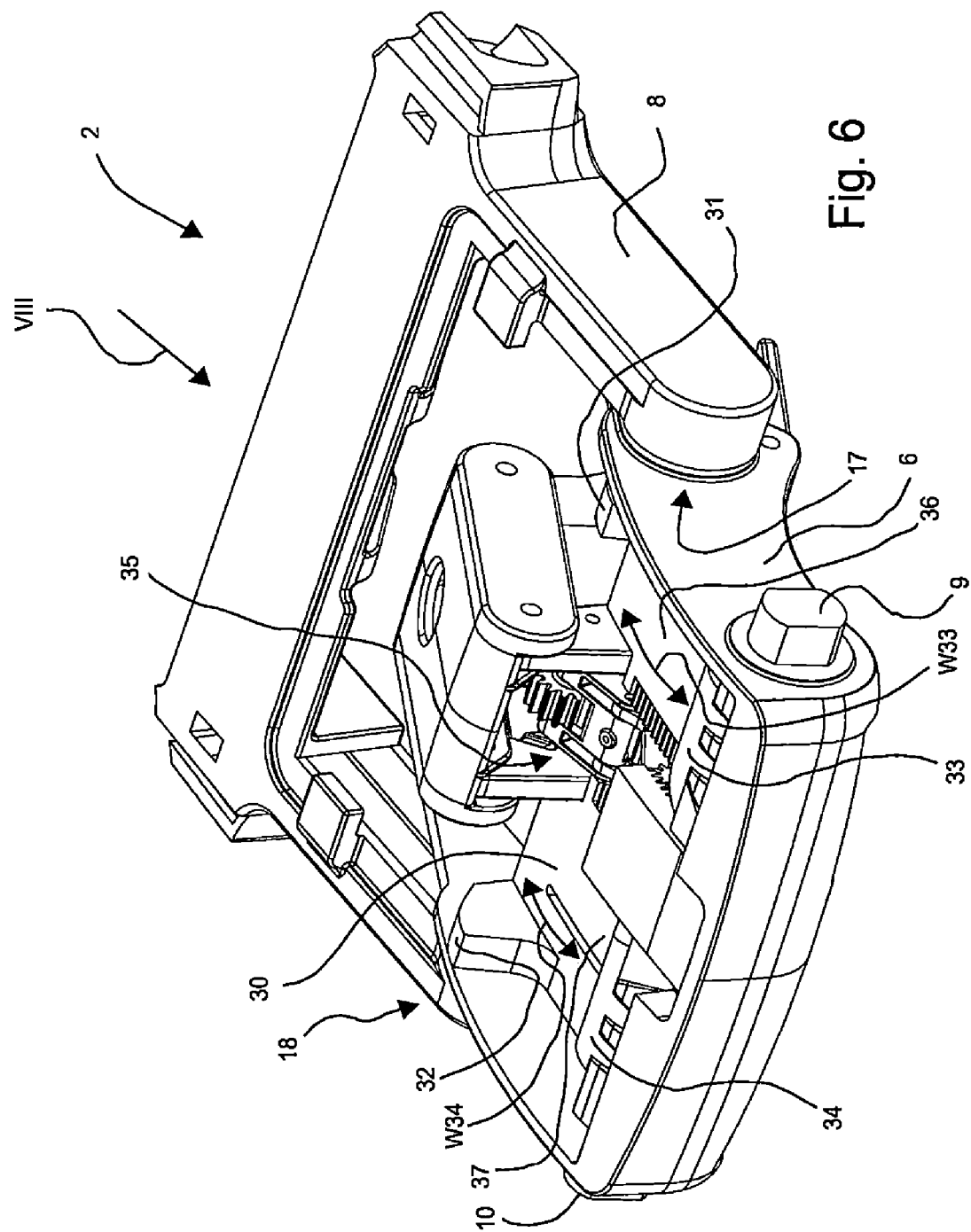
FIG. 6 shows the illustration of FIG. 5, with the leaf springs disregarded.
Figure 7:
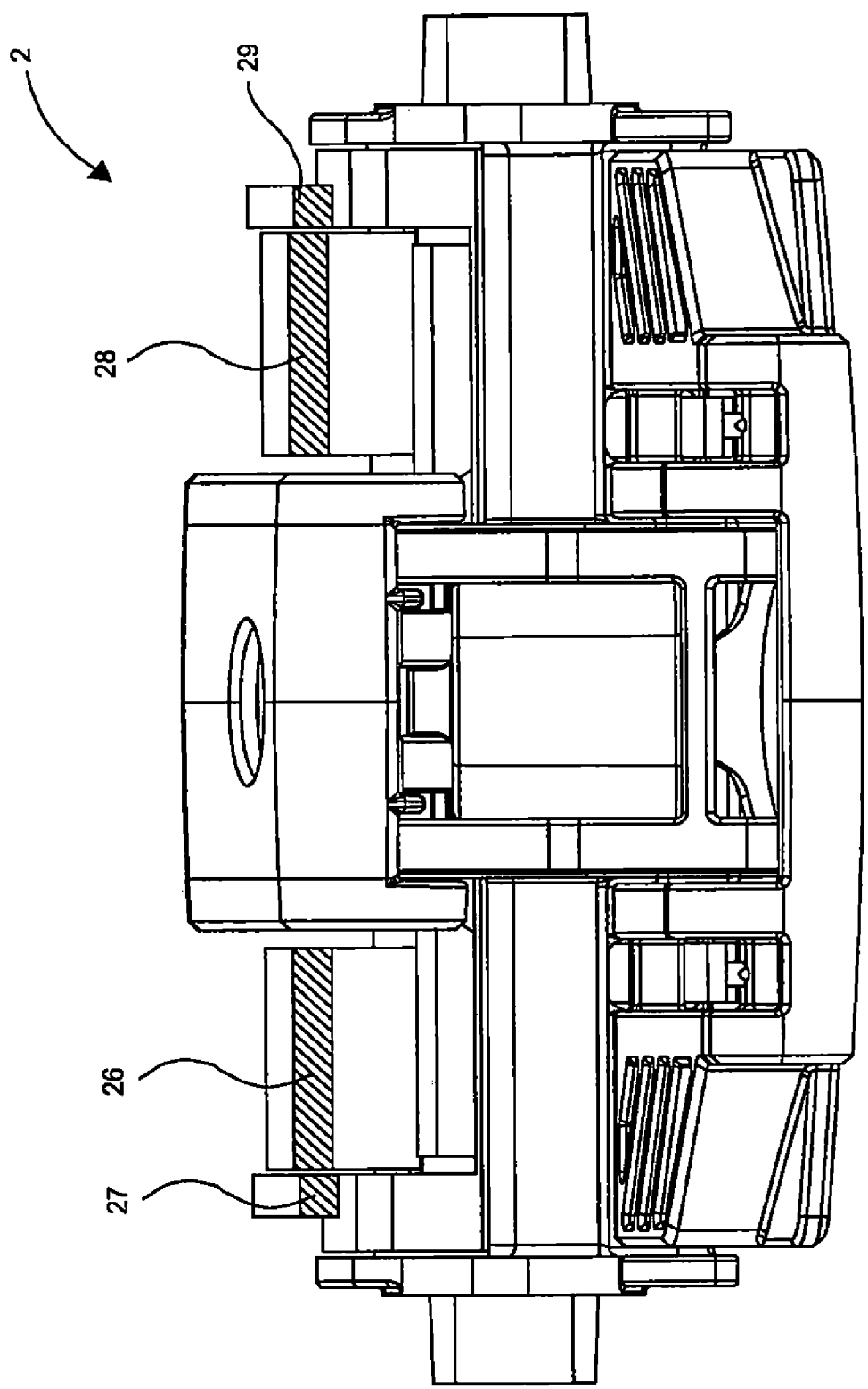
FIG. 7 shows a side view of FIG. 6, corresponding to the direction of the arrows VII shown therein.
Figure 8:
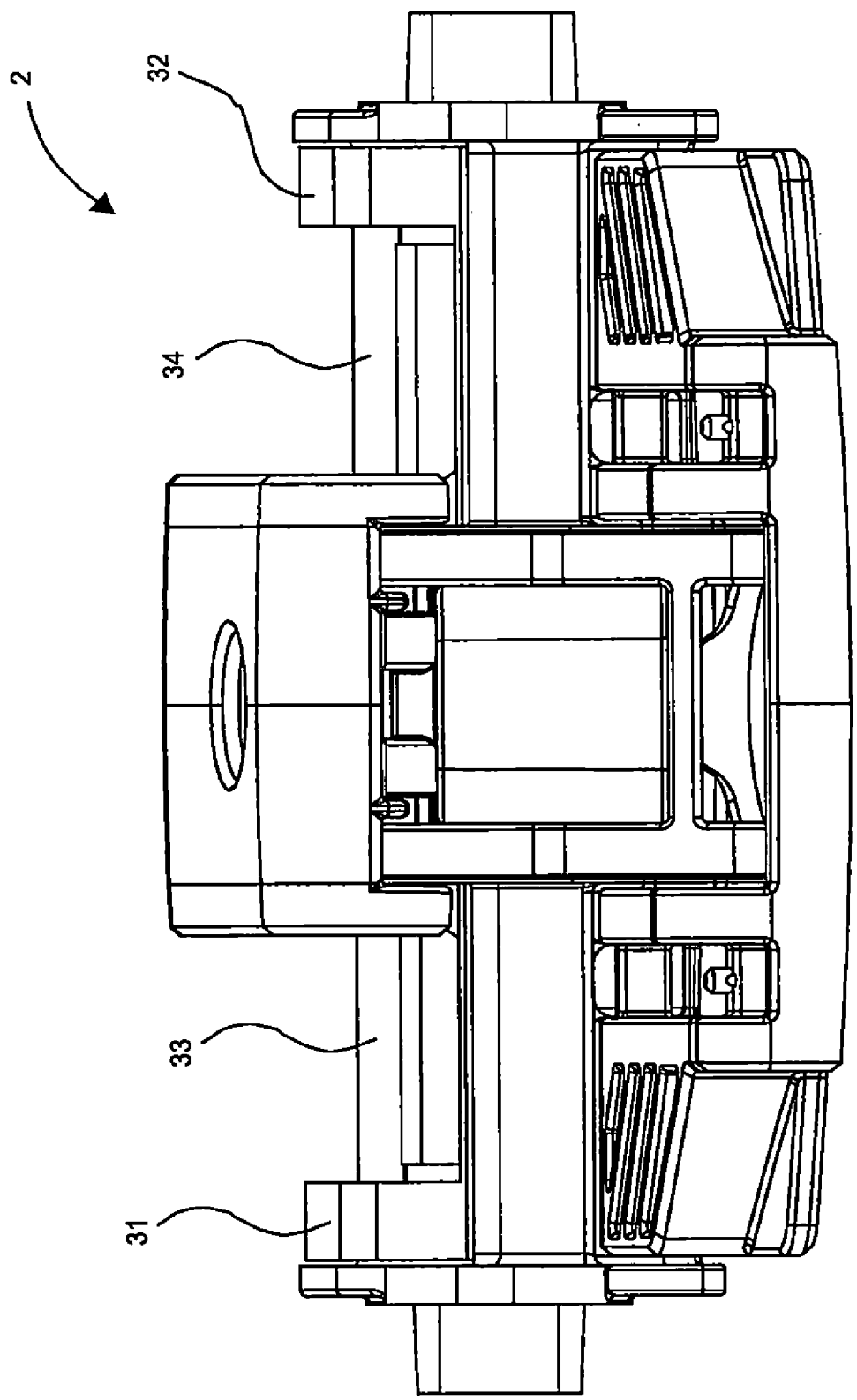
FIG. 8 shows the illustration of FIG. 7, with the leaf springs disregarded.
Figure 9:
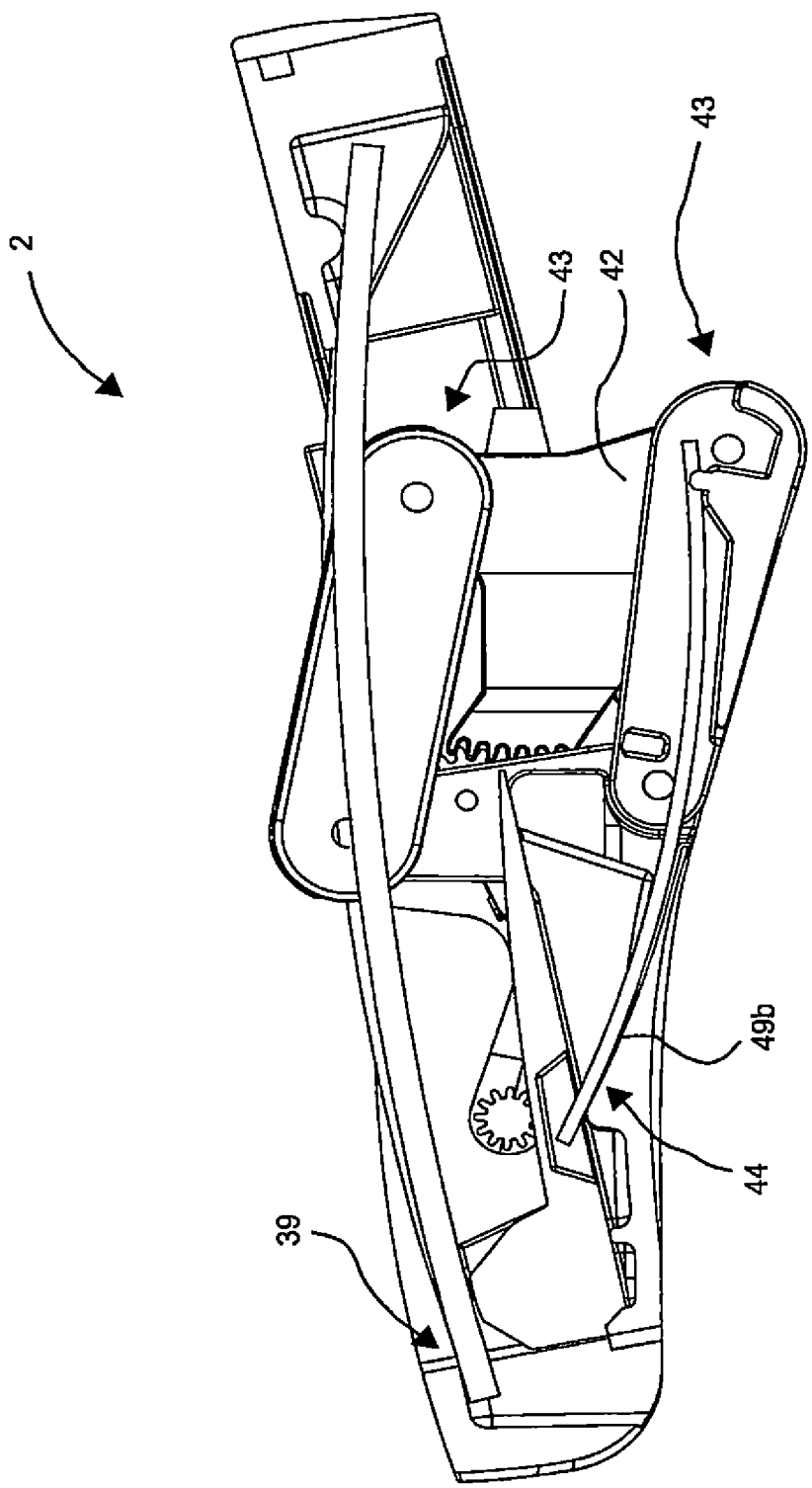
FIG. 9 shows a sectional side view of the mechanical assembly.
Figure 10:
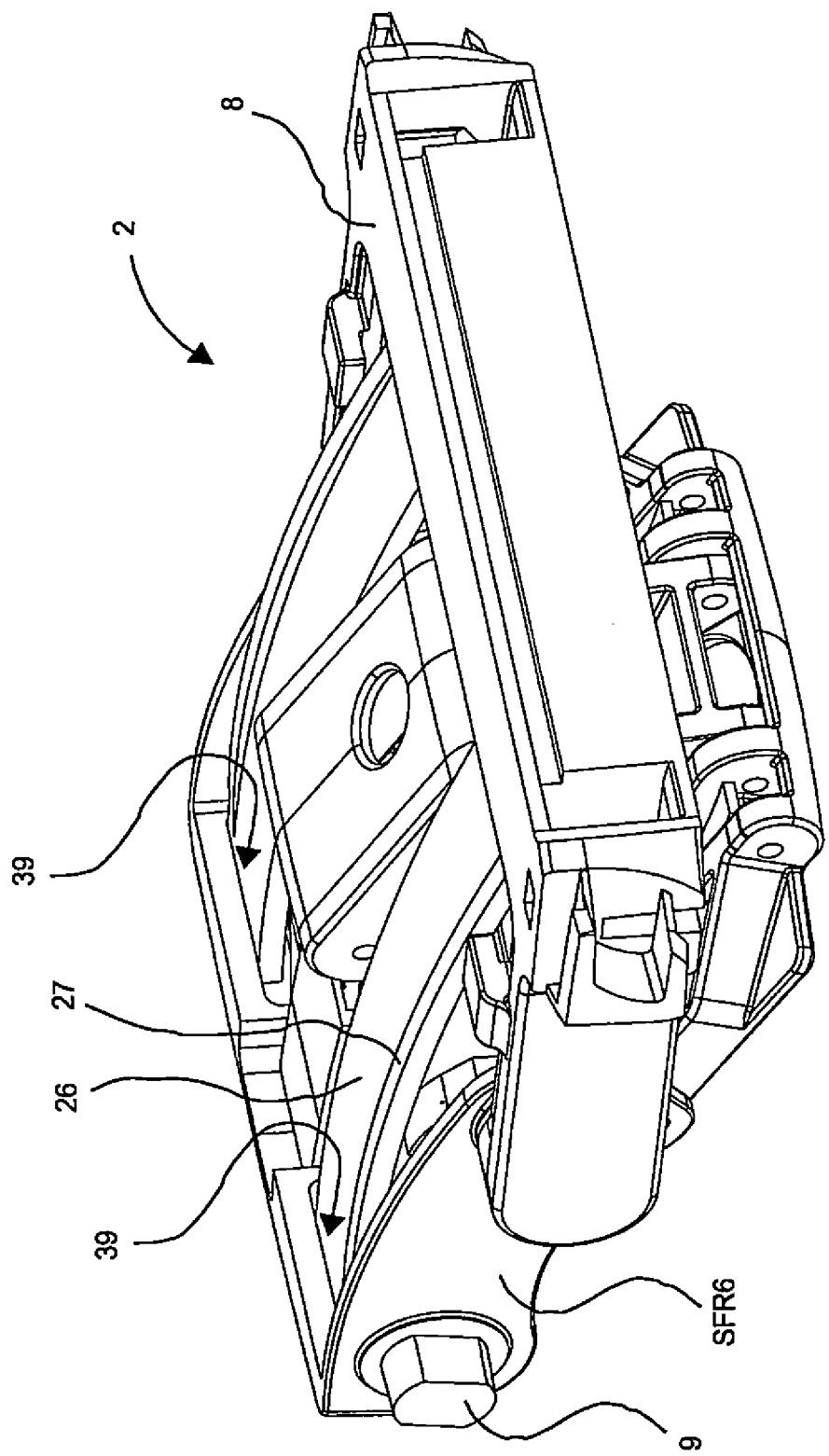
FIG. 10 shows a further perspective view of the mechanical assembly.
Figure 11:
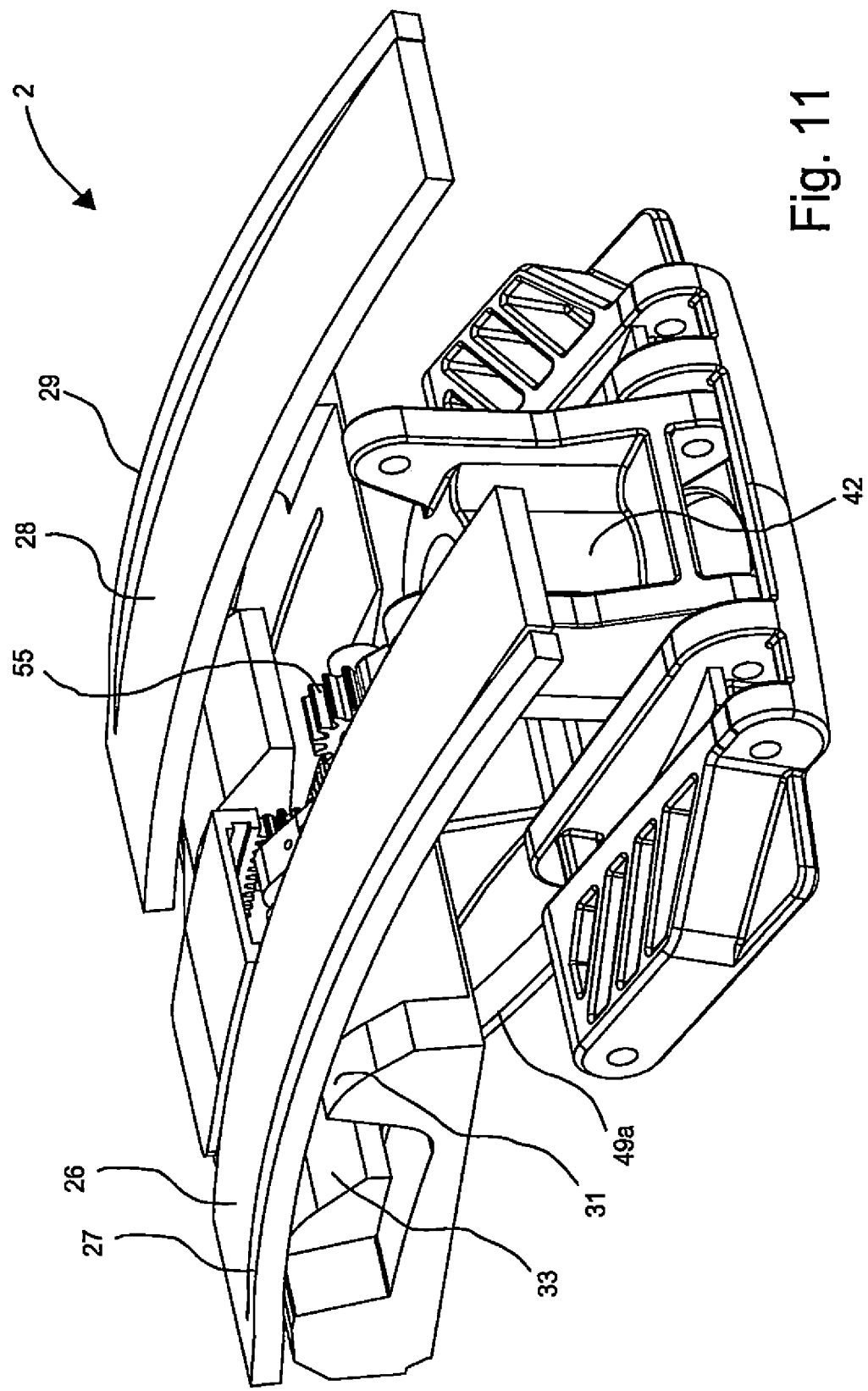
FIG. 11 shows the illustration of FIG. 10, with the support disregarded and the rear swing arm disregarded.

The two internal leaf springs 26, 28 of the mechanical assembly 2 are assigned to the displaceable bearings 33, 34, wherein each bearing 33, 34 is assigned to one of the leaf springs 26, 28, and wherein the bearings 33, 34 are displaceable below the leaf springs 26, 38 by the adjustment mechanism 35, and are displaceable thereby in each case on their raceways 36, 37 by identical paths W33, W34 (see FIG. 6).

Figure 19:
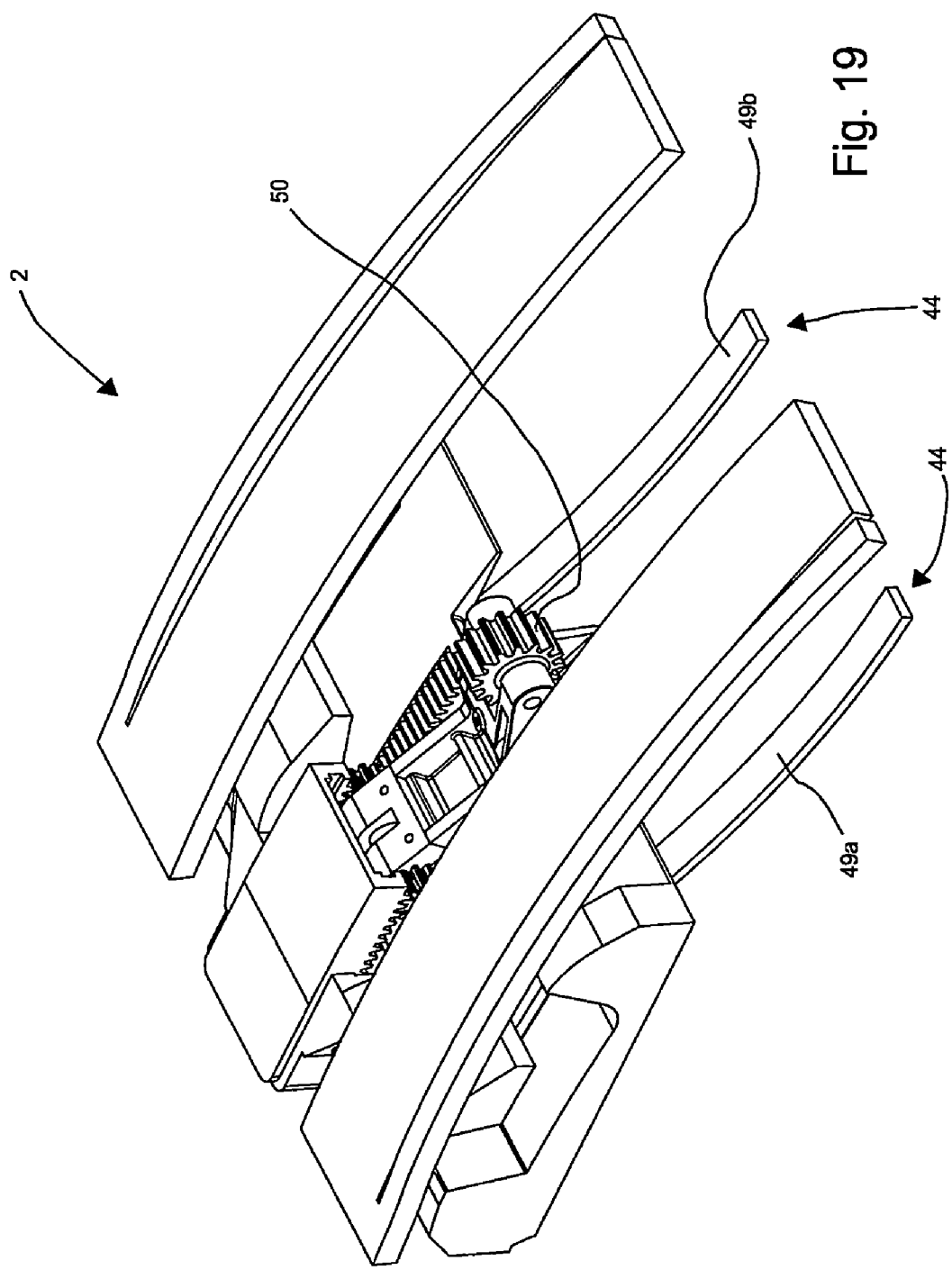

The support 6 is indirectly connected to the foot element 3, wherein the mechanical assembly 2 in addition to the support 6 further comprises a flange 42 (see FIG. 18), an articulation means 43 (see FIG. 9), and a weighing means 44 (see FIG. 19). The flange 42 here is connected to the foot element 3. The support 6 here by way of the articulation means 43 is articulated on the flange 42, and the support 6 here by way of the weighing means 44 is supported on the flange 42 (see FIG. 9). The articulation means 43 is configured as a four-point articulation having four articulation axes GLA-1 to GLA-4, this enabling the support 6 to be lowered when stressed by a person sitting down. The support 6 herein sinks down so far until the stress on the former is compensated for by the weighing means 44 which is formed by the further leaf springs or weighing springs 49a, 49b, respectively (see also FIG. 19). As soon as the person stands up again, the weighing springs 49a, 49b raise the support 6 again.

The adjustment mechanism 35 comprises a mechanical weighing action 45 and a mechanical adjustment action 46, wherein the mechanical weighing action 45 drives the mechanical adjustment action 46 depending on the body weight G of a person seated on the seat element 5, and the displaceable bearings 33, 34, depending on the body weight G of the person seated, are simultaneously displaced by the mechanical adjustment action 46 by identical paths W33, W34 along their raceways 36, 37 in such a manner that the seat shell S is supported by way of the rear swing arm 8 on the support 6 to a degree so as to correspond to the body weight G of the person (see in particular also FIG. 18). To this end, the mechanical adjustment action 46 which is driven by the mechanical weighing action 45, comprises a first transmission 47 having a first reduction gearing or positive gearing, and a second transmission 48 having a second reduction gearing or positive gearing.

According to the variant of embodiment illustrated, the first and the second transmission 47, 48 are configured with the identical gear ratio, or the identical reduction gearing or the identical positive gearing, respectively. To this end, reference is made in particular to FIG. 18 and to FIGS. 12 to 14 which show the various positions.

With respect to the fundamental function of a weighing mechanism in which an adjustment of the restoring force by which the chair counteracts the movements of the person—such as leaning back, for example—is performed by way of the body weight of a person seated on the chair, reference is made in principle to WO 2007/110732 A2 which has already been referred to in the introduction to the description.

Figure 12:
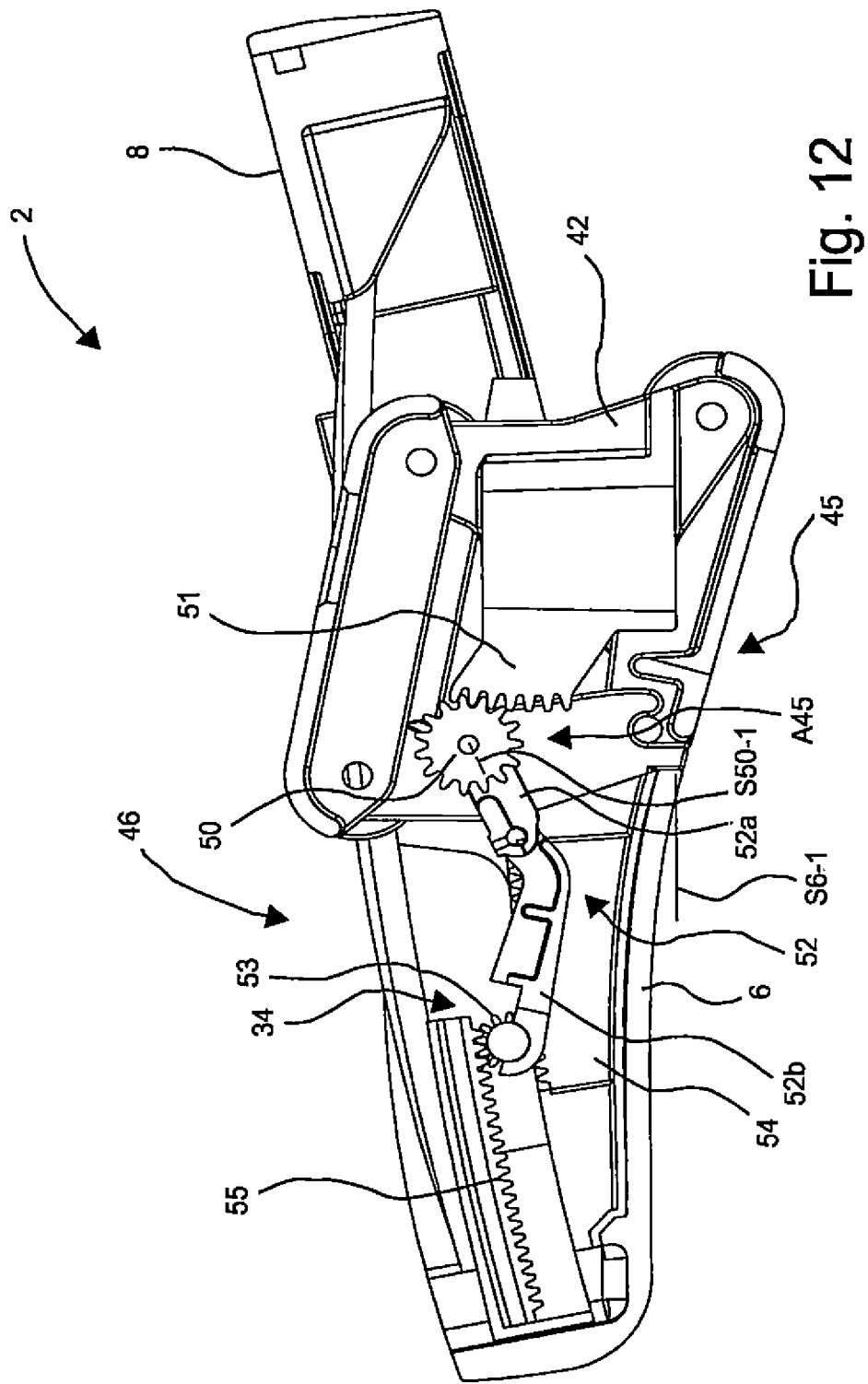
FIGS. 12 to 14 show sectional side views of the mechanical assembly in the unstressed, lightly stressed, and heavily stressed position of the support.
Figure 13:
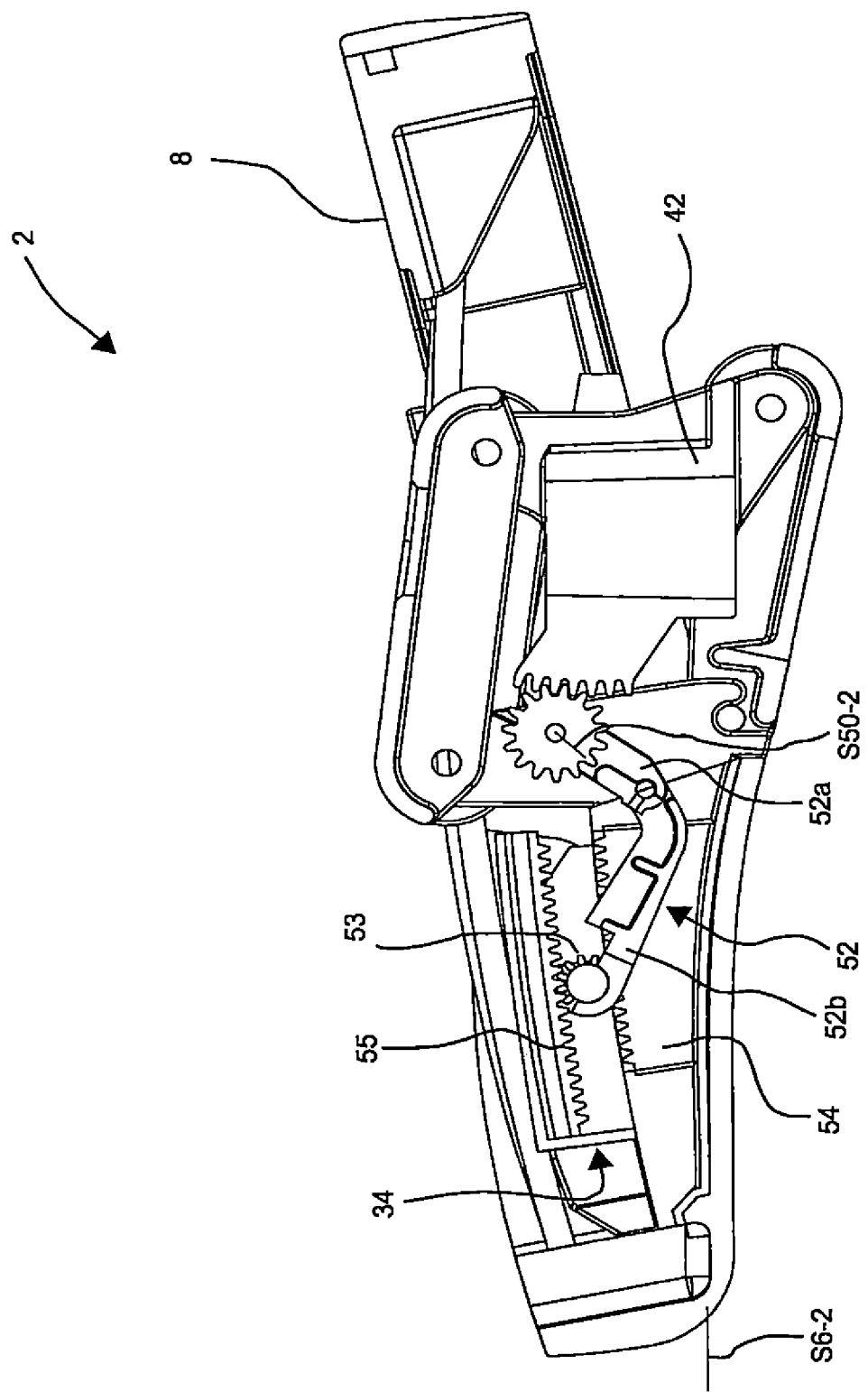
Figure 14:
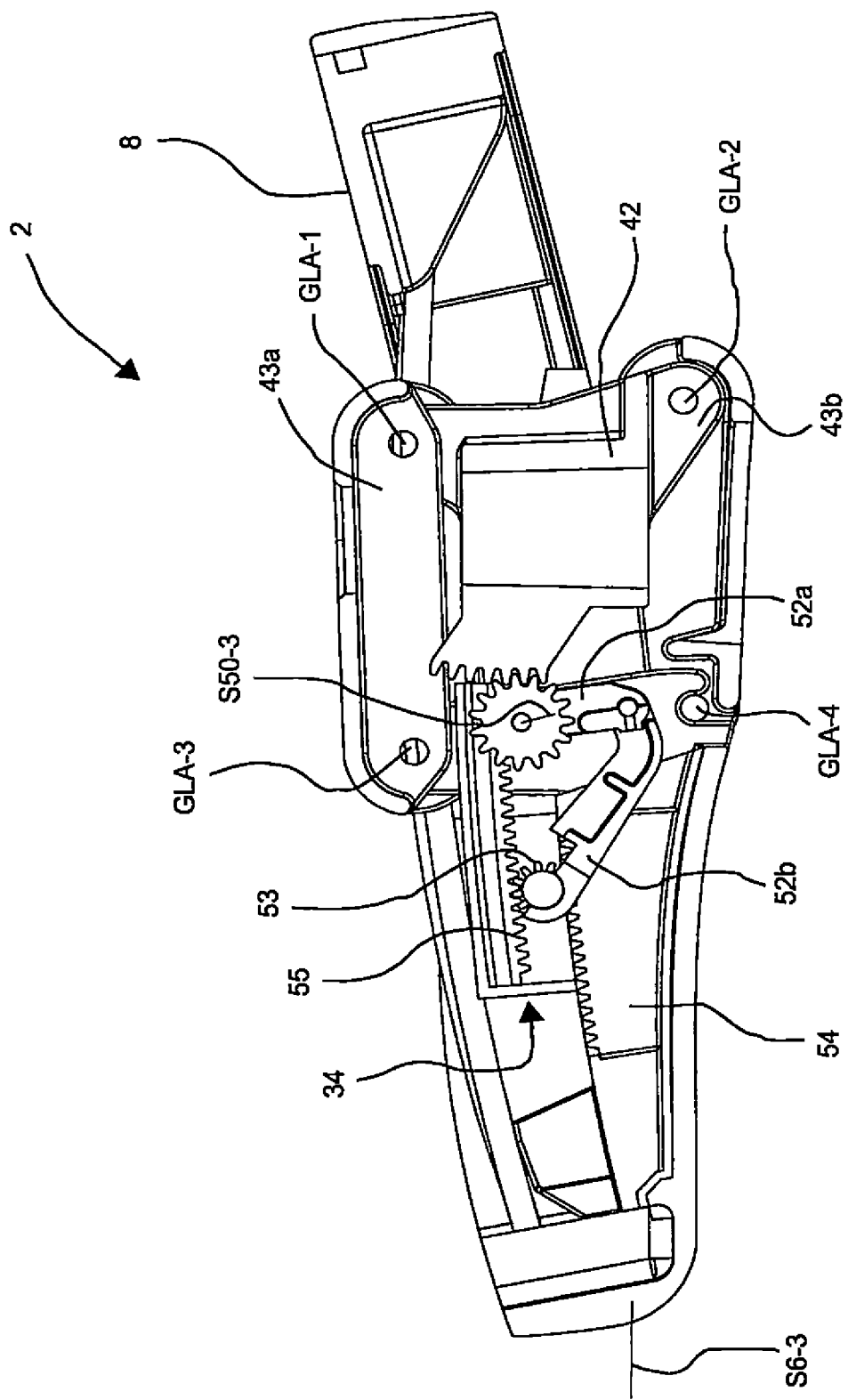

FIG. 12 shows a longitudinal section through the mechanical assembly 2, wherein the flange 42 which is fixed onto the foot element 3 is identifiable. By way of the weighing means 44 which is visible in FIGS. 9 and 19, respectively, and which is configured by the two further leaf springs 49a, 49b, the support 6, by which the seat shell S (not illustrated) is supported, is held in the unstressed position S6-1 which is shown in FIG. 12. Here, a gear wheel 50 of the mechanical adjustment action 46, which is rotatably mounted on the support 6, meshes with a rack 51 which is configured on the flange 42, together with the latter forming a drive A45 for the transmissions 47, 48. In the event of light stress acting on the seat element 5 or the seat shell S, respectively, the support 6, counter to the spring force of the leaf springs 49a, 49b, is lowered in relation to the flange 42 into the position S6-1 which is shown in FIG. 13. During lowering, the gear wheel 50 is driven by the rack 51 and rotates in an anticlockwise manner from a first rotary position S50-1 (see FIG. 12) to a second rotary position S50-2 (see FIG. 13). By way of an articulated lever 52, the first leg 52a of which is rigidly connected to the gear wheel 50 and the second leg 52b of which is connected in a rotating articulated manner to the first leg 52a, and the second leg 52b of which at its free end rotatably supports a further gear wheel 53, the left-hand rotation of the first gear wheel 50 forces the articulated lever 52 to slightly buckle. As this buckling takes place, the second gear wheel 53, which runs between a further rack 54 which is configured on the support 6 and a rack 55 which is configured on the displaceable bearing 34, rolls on the lower rack 54. Here, on account of its right-hand rotation and its change of position, the second gear wheel 53 moves the third rack 55 and thus the bearing 34 to the right in the direction of the flange 42, such that the leaf spring 28 which is assigned to the bearing 34 is subject to increasing support and, on account thereof, exerts a greater restoring force on the rear swing arm 8. In FIG. 14, the body weight acting on the seat element 5 or the seat shell S, respectively, is even greater, and the support in relation to the flange 42 is lowered to the position S6-3, such that the bearing 34 is moved farther in the direction of the flange 42.

The second transmission 48 mentioned thus comprises the articulated lever 52, the second gear wheel 53, and the racks 54 and 55. As can be seen from FIG. 50, the first gear wheel 50 drives the articulated levers of both transmissions and is thus a component part of both transmissions. Deviating from the illustrations of FIGS. 1 to 19, different gear ratios or reduction gearings or positive gearings, respectively, of the transmissions can thus be implemented by differently conceived articulated levers that move independently of one another and/or by a different layout of the units that are formed by the respective second gear wheel, the associated rack, and the associated bearing.

The first transmission 47 (not illustrated in more detail) again comprises all the components mentioned, such that also the other bearing 33 is movable, depending on the rotation movement of the rack 51 performed on the flange 42 and on the thus caused rotation movement of the gear wheel 50. Here, the first transmission which moves the bearing 33, and the second transmission which moves the bearing 34, have identical gear ratios or reduction gearings or positive gearings, respectively, and, on account thereof move the bearings 33, 34 in a synchronous manner, or by identical paths W33, W34 in the same periods of time, respectively.

As has been mentioned, in FIG. 14 the support 6 is shown in the heavily stressed position S6-3, in which the gear wheel 50 is in a rotary position S50-3. Accordingly, in this rotary position S50-3, the bearing 34 is then also displaced even farther towards the right in the direction of the flange 42, such that the leaf spring 28 exerts an even higher restoring force on the rear swing arm 8. The support 6 is guided on the flange 42 by way of the articulation means 43, these being implemented as two levers 43a, 43b which operate in parallel.

It can be seen from FIG. 17, for example, that the wide leaf spring 26 and the narrow leaf spring 27, and the wide leaf spring 28 and the narrow leaf spring 29, that is to say in each case an additional leaf spring with an adjustable leaf spring, in their first end regions 26a, 27a, and 28a, 29a, respectively, are in each case interconnected to form finger springs 56, 57, and outside their first end region 26a, 27a, and 28a, 29a, respectively, namely in a central region 26d, 27d, and 28d, 29d, respectively, and an opposite end region 26c, 27c, and 28c, 29c, respectively, are in each case separated by a slot 56a and 57a, respectively.

Figure 20:
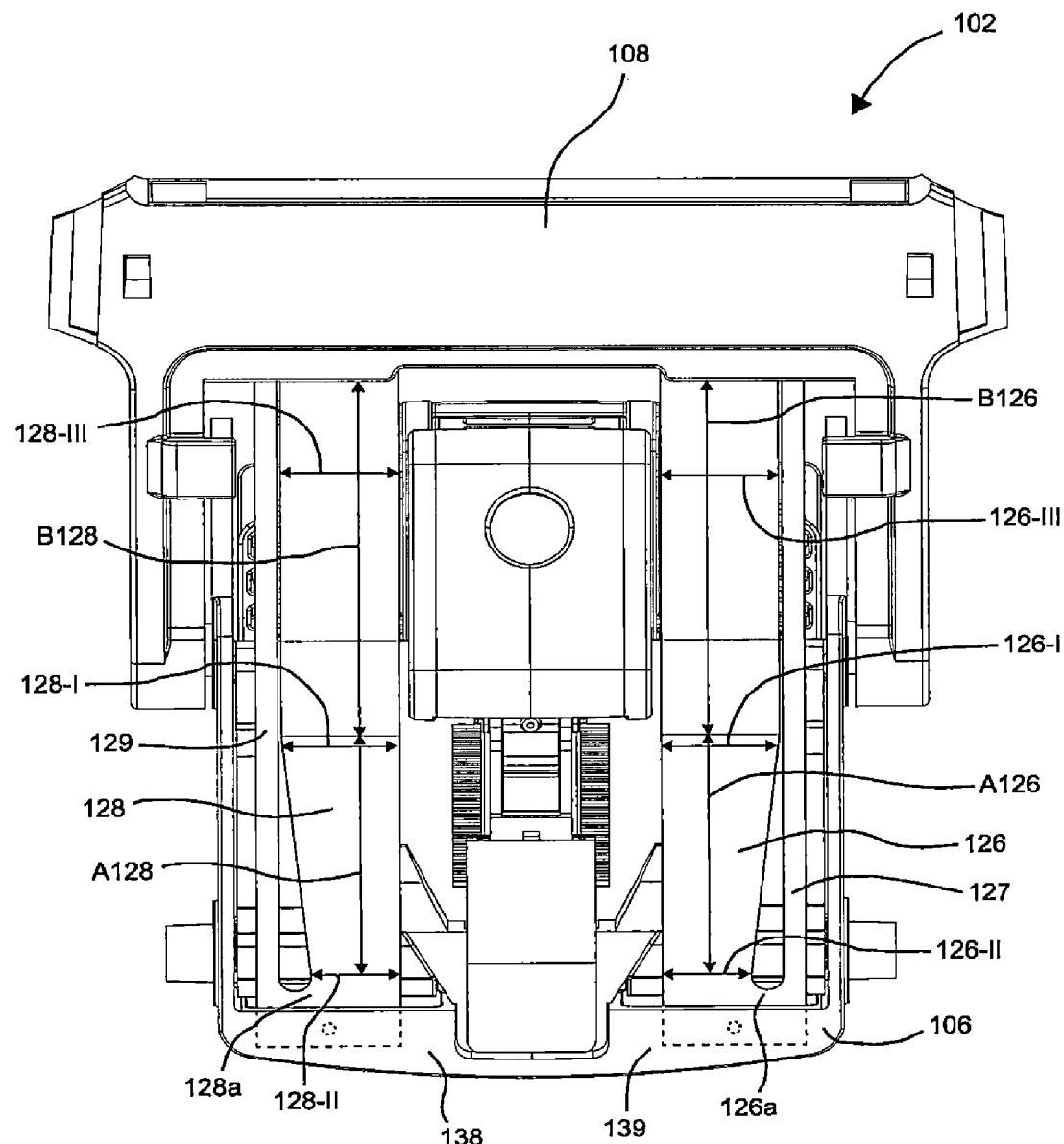
FIGS. 20 to 22 show a second to fourth variant of embodiment of the first variant of embodiment of a mechanical assembly of a chair as shown in FIGS. 1 to 19.
Figure 21:
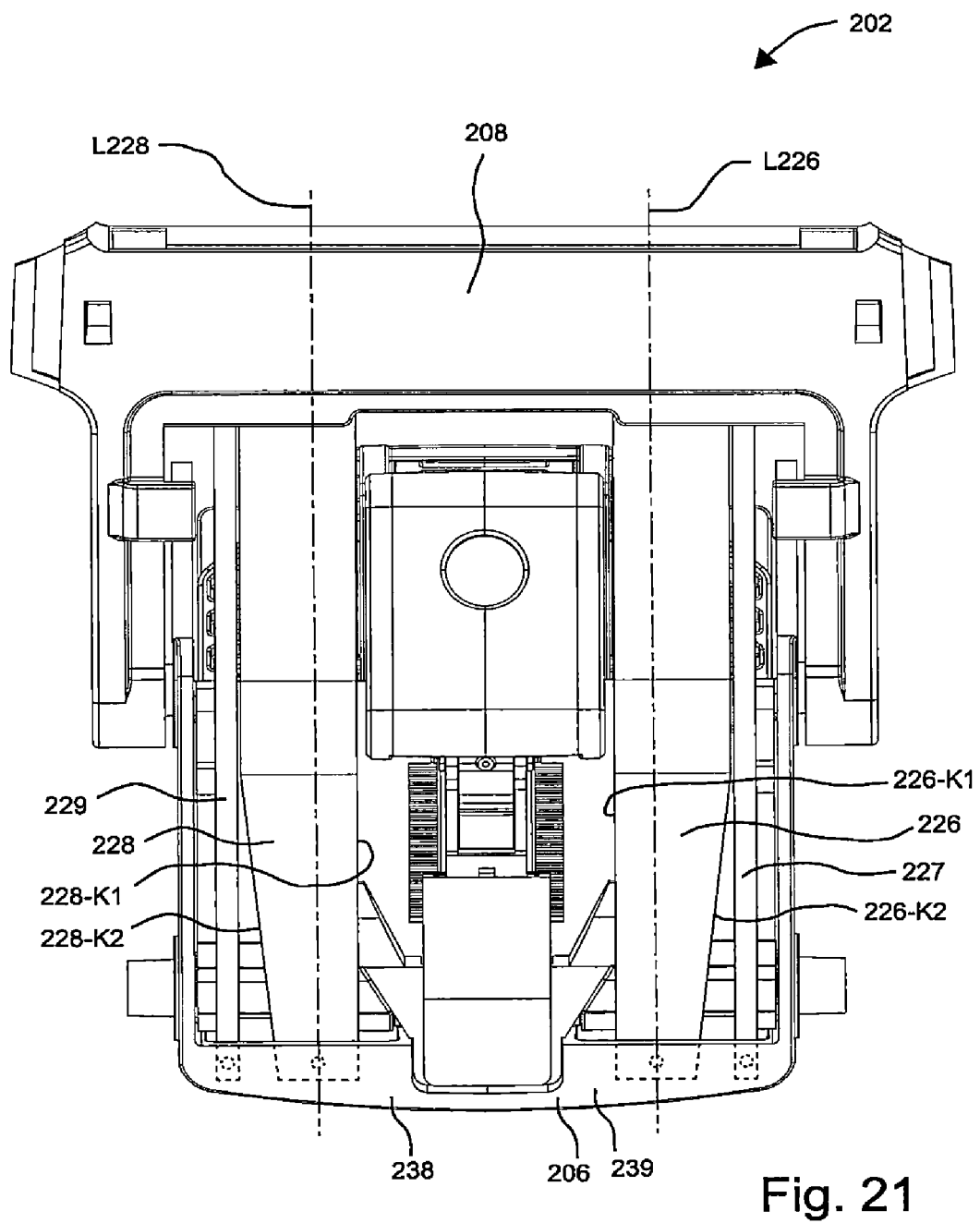
Figure 22:
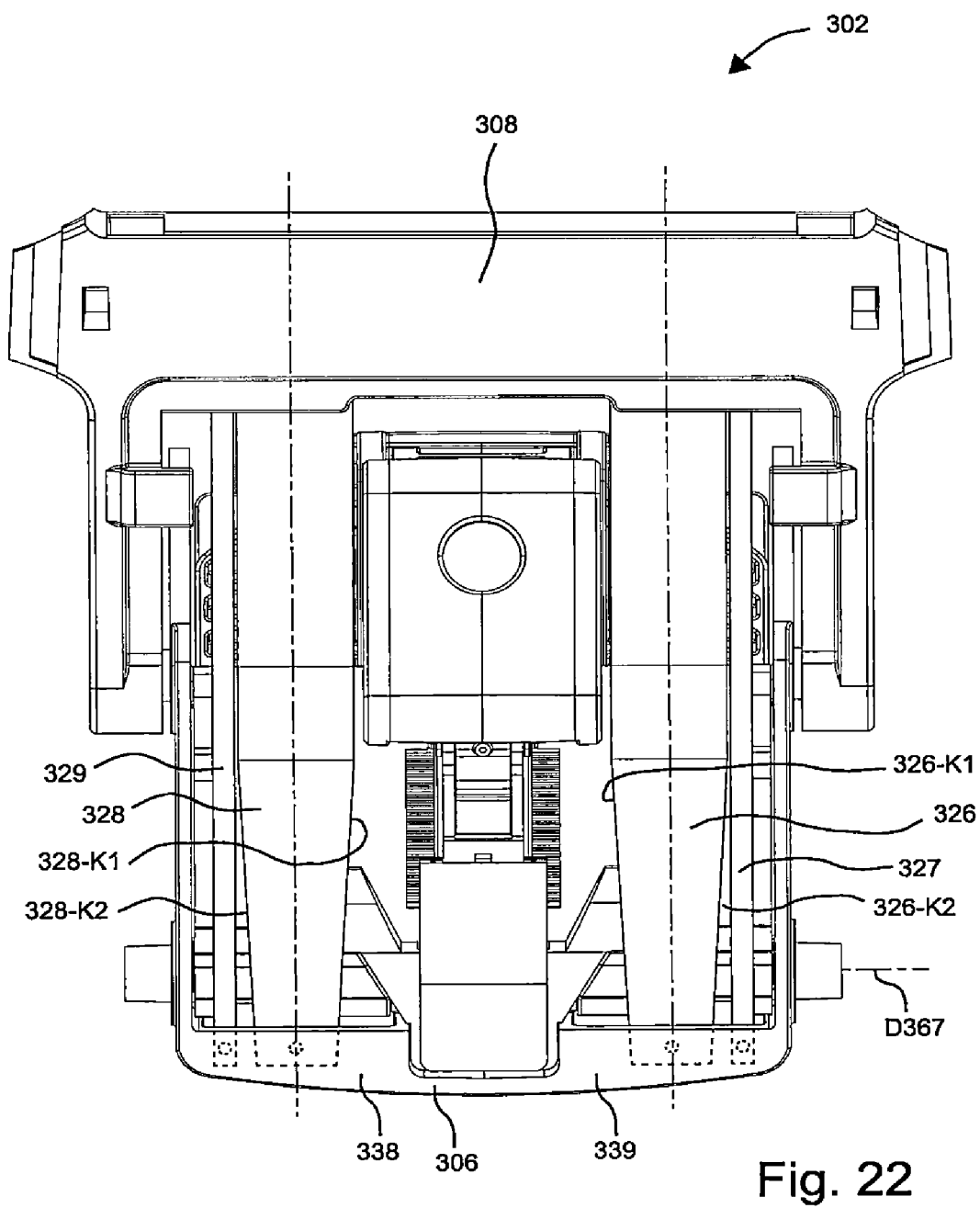
Figure 23:
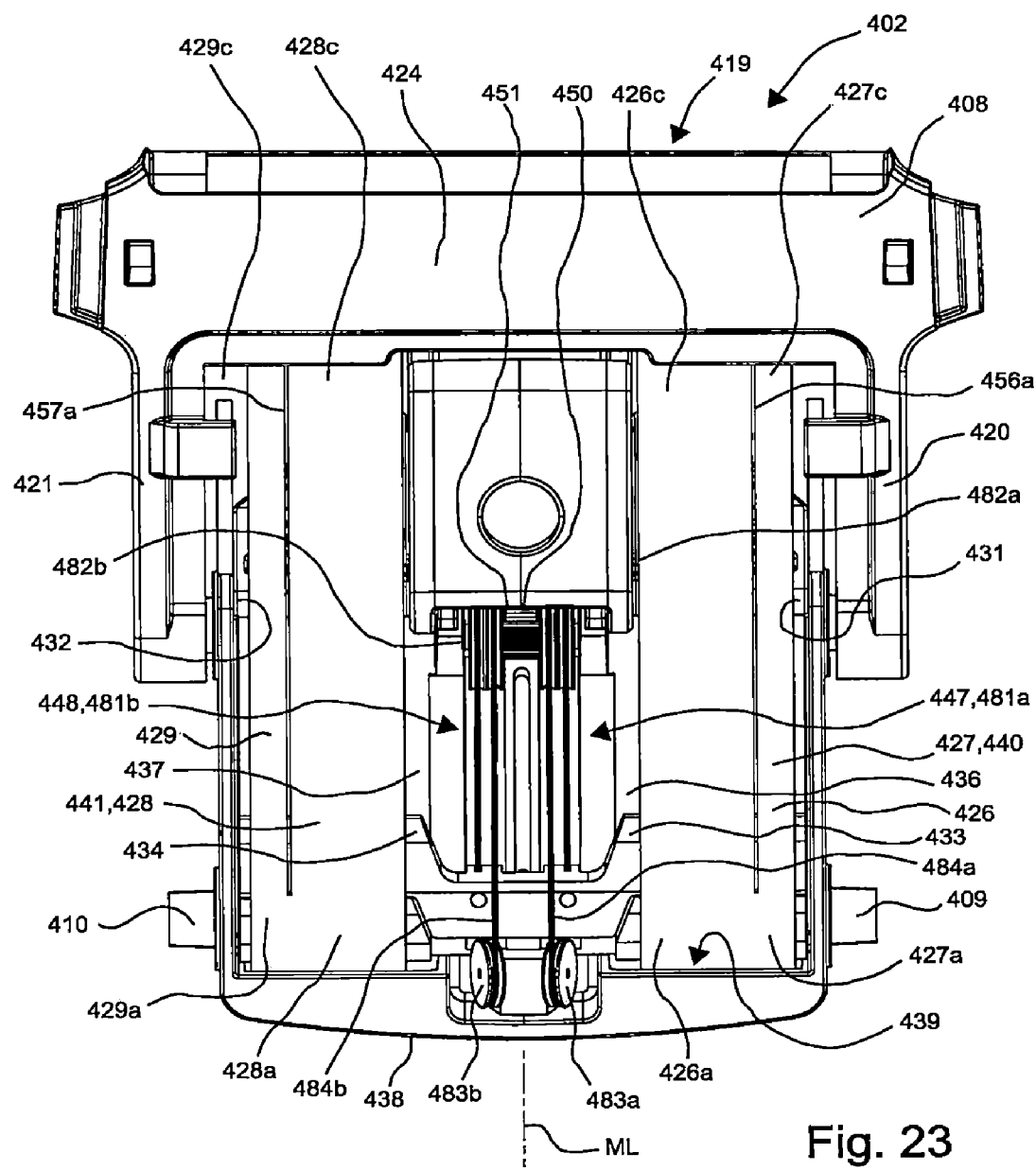
FIGS. 23 to 29 show various views of a fifth variant of embodiment of a mechanical assembly of a chair.

The mechanical assemblies illustrated in FIGS. 20 to 22 are constructed in a manner comparable to that of the mechanical assembly shown in FIGS. 1 to 19. Accordingly, reference signs that are higher by 100 or 200 or 300, respectively, are used in each case for components that are comparable in principle, and reference is made herewith also to the description pertaining to FIGS. 1 to 19.

Figure 15:
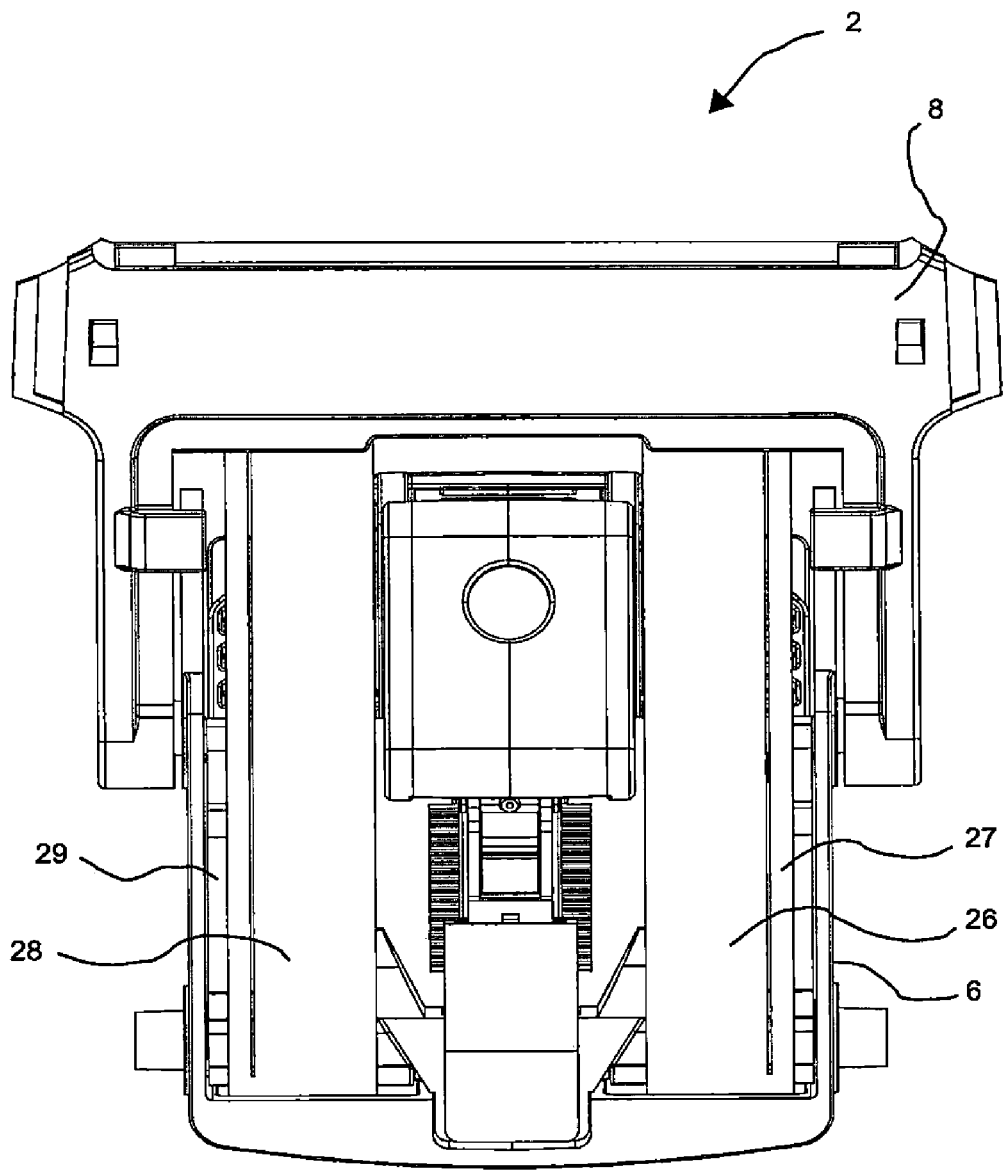
FIG. 15 shows a plan view of the mechanical assembly.
Figure 16:
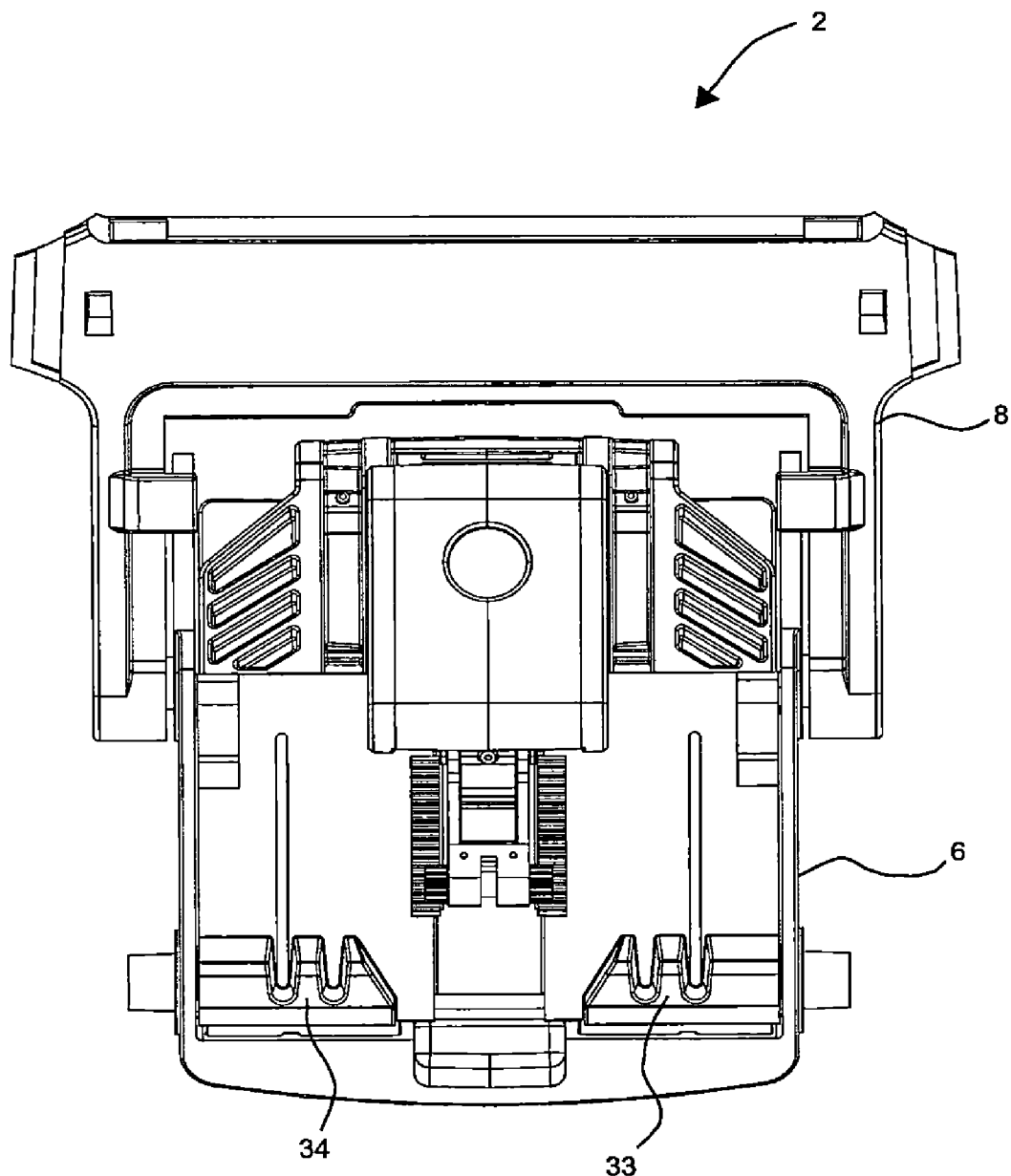
FIG. 16 shows a plan view of the illustration of FIG. 15, with the leaf springs removed.

In FIG. 20, a second variant of embodiment of a mechanical assembly 102 is shown in a view that is comparable to that of FIG. 15. Here too, a wide internal leaf spring 126 and a narrow external leaf spring 127, and a wide internal leaf spring 128 and a narrow external leaf spring 129 can be seen in a plan view. Said leaf springs at the end side and on one side are clamped in a receptacle 139 that is formed by a bulkhead 138 of a support 106, said leaf springs supporting a rear swing arm 108. Bearings (not identifiable in more detail in the present illustration) are disposed below these leaf springs as is the case with the first variant of embodiment. The leaf springs 126 and 127 and 128 and 129 by way of a connection web 126a or 128a, respectively, are interconnected in the region of the receptacle 139. By contrast to the first variant of embodiment of the mechanical assembly, the wide leaf springs 126 and 128 of the second variant of embodiment of the mechanical assembly 102 are configured in such a manner that said leaf springs in a portion A126 or A128, respectively, that is proximal to the receptacle 139 towards the receptacle 139 taper off from a width 126-I or 128-I, respectively, to a width 126-II or 128-II, respectively. In a portion B126 or B128, respectively, that is remote from the receptacle 139 and adjoins the portion A126 or A128, respectively, the leaf springs 126 or 128, respectively, throughout have a width 126-III or 128-III which corresponds approximately to the width 126-I or 128-I, respectively.

It is also provided that the wider leaf springs in the portion thereof that is proximal to the receptacle in the plan view are configured so as to be similar to a triangle or similar to a lozenge or similar to a trapeze.

It is furthermore also provided that the wider leaf springs particularly by way of a reduction of the width thereof towards the receptacle are designed in such a manner that the bending moment of the former decreases towards the receptacle.

In FIG. 21, a third variant of embodiment of a mechanical assembly 202 is shown in a view that is comparable to that of FIG. 15 or 20, respectively. Here too, a wide internal leaf spring 226 and a narrow external leaf spring 227, and a wide internal leaf spring 228 and a narrow external leaf spring 229 can be seen in a plan view. Said leaf springs at the end side and on one side are clamped in a receptacle 239 that is formed by a bulkhead 238 of a support 206, said leaf springs supporting a rear swing arm 208. By contrast to the second variant of embodiment, the leaf springs here are embodied as independent non-connected components. As is also the case in the second variant of embodiment, the wider leaf springs 226 and 228 in terms of the width thereof taper off towards the receptacle 239 or towards the support 206, respectively. The leaf springs 226 and 228 herein have an edge 226-K1 or 228-K1, respectively, that latter being parallel to a longitudinal extent L226 or L228, respectively. The leaf springs 226 and 228 herein have an edge 226-K2 or 228-K2, respectively, that proximal to the receptacle 239 runs obliquely in relation to a longitudinal extent L226 or L228, respectively, of the wider leaf springs 226 or 228, respectively.

In FIG. 22, a fourth variant of embodiment of a mechanical assembly 302 is shown in a view that is comparable to that of FIG. 15 or 20 or 21, respectively. Here too, a wide internal leaf spring 326 and narrow external leaf spring 327, and a wide internal leaf spring 328 and a narrow external leaf spring 329 can be seen in a plan view. Said leaf springs at the end side and on one side are clamped in a receptacle 339 that is formed by a bulkhead 338 of a support 306, said leaf springs supporting a rear swing arm 308. By contrast to the second variant of embodiment, the leaf springs here are embodied as independent non-connected components. As is the case also in the second and the third variant of embodiment, the wider leaf springs 326 and 328 in terms of the width thereof taper off towards the receptacle 339 or towards the support 306, respectively. The leaf springs 326 and 328 herein each have two edges 326-K1 and 326-K2, or 328-K1 and 328-K2, respectively, that proximal to the receptacle 339 runs obliquely in relation to a longitudinal extent L326 or L328, respectively, of the wider leaf springs 326 or 328, respectively. The longitudinal extent L326 or L328, respectively, herein is aligned so as to be orthogonal in relation to a rotation axis D367.

On account of the design embodiment that is described in conjunction with FIGS. 20 to 22 it is possible for the mechanism to be set more precisely to persons in the weight range from approximately 40 kg to 60 kg.

As an alternative to the mechanical assembly 2 that is shown in FIG. 1, a fifth variant of embodiment of a mechanical assembly 402 that is shown in various views in FIGS. 23 to 29 is also suitable for connection to the further assemblies as shown in FIG. 1 of the chair 1 shown in FIG. 1, such that a chair according to the invention can also be configured having the mechanical assembly 402.

The fifth variant of embodiment of the mechanical assembly 402 that is shown in a schematical illustration in FIGS. 23 to 29 has a construction that is fundamentally comparable to that of the first variant of embodiment of the mechanical assembly 2. To this extent, reference is made also to the description pertaining to the first variant of embodiment of the mechanical assembly 2. Equivalent components herein are in each case referred to with a reference numeral that is higher by 400. The rear swing arm 408 is illustrated so as to show approximately only half of the former.

By contrast to the first variant of embodiment of the mechanical assembly 2, in the case of the fifth variant of embodiment of the mechanical assembly 402 the first and the second transmission 447 and 448 are not configured as rack transmissions but are in each case configured as a belt transmission 481a or 481b, respectively. In order for the two belt transmissions 481a, 481b to be driven, the gear wheel 450 that is rotatably disposed on the support 406 and in the case of the support 406 being stressed by a weight of a person seated rolls on the rack 451 that is disposed on the flange 442 is connected in a rotationally fixed manner to a first belt pulley 482a of the first belt transmission 481a and connected in a rotationally fixed manner to a first belt pulley 482b of the first belt transmission 481b. The gear wheel 450 and the rack 451 thus form a drive A445 for the belt transmissions 481a, 481b.

The first belt transmission 481a, apart from the first belt pulley 482a, comprises a second belt pulley 483a, a belt 484a, and an entrainment element 485a that is connected to the belt 484a.

The second belt transmission 481b, apart from the first belt pulley 482b, comprises a second belt pulley 483b, a belt 484b, and an entrainment element 485b that is connected to the belt 484b.

The two belt transmissions 481a and 481b have the same gear ratio such that the bearing 433, disposed on the entrainment element 485a, of the first belt transmission 481a, and the bearing 434, disposed on the entrainment element 485b, of the second belt transmission 481b are moved by identical paths W433 or W434, respectively, and at the same speed, in a manner depending on the weight of a person seated on the chair. In other words, the two bearings 433 and 434 are moved in a synchronous manner. In order to ensure movement of the bearings 433 and 434 when one of the belts 484a or 484b, respectively, slips, for example, the two bearings 433 and 434 are interconnected by a web 486.

Figure 24:
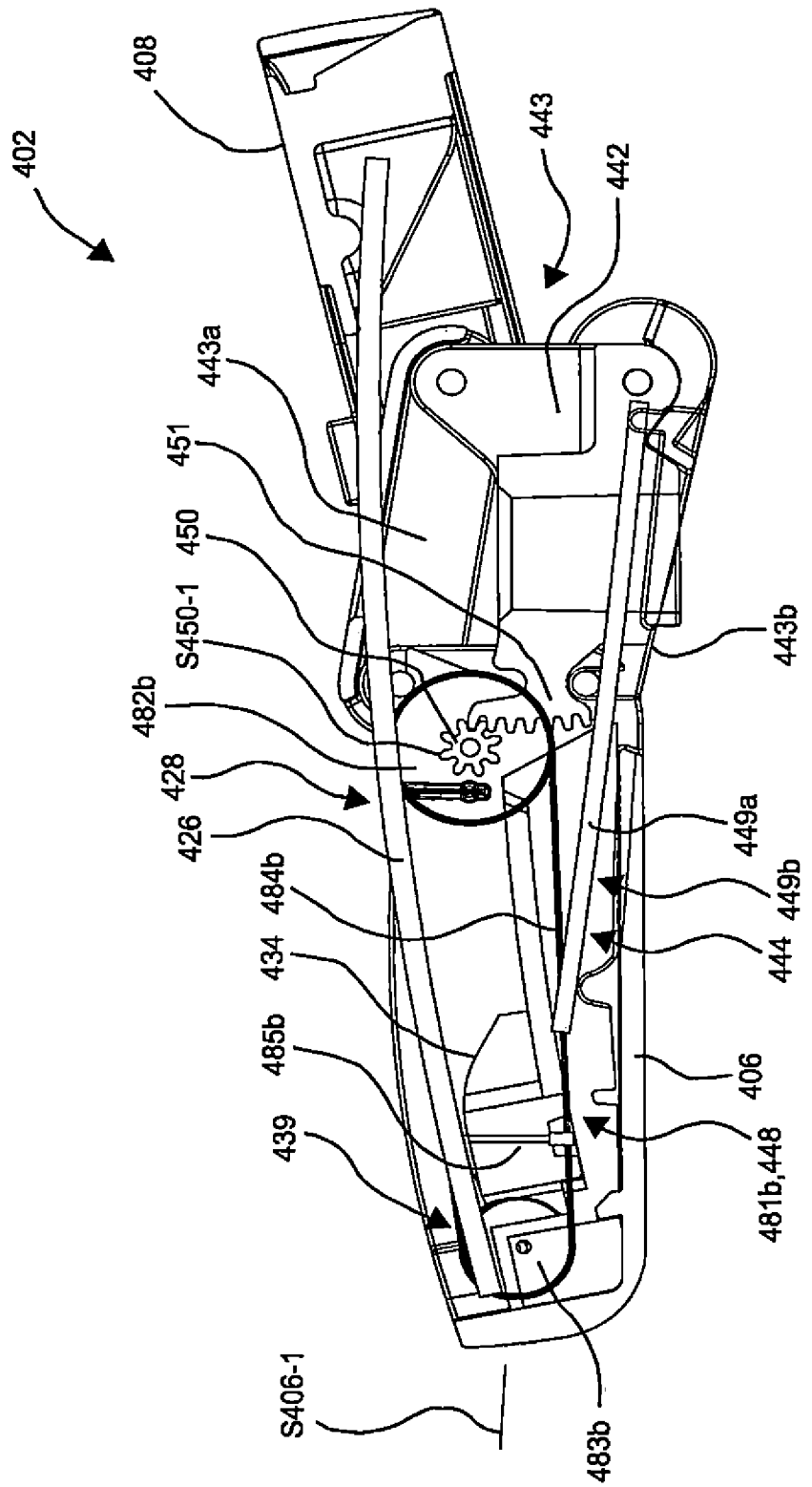
Figure 25:
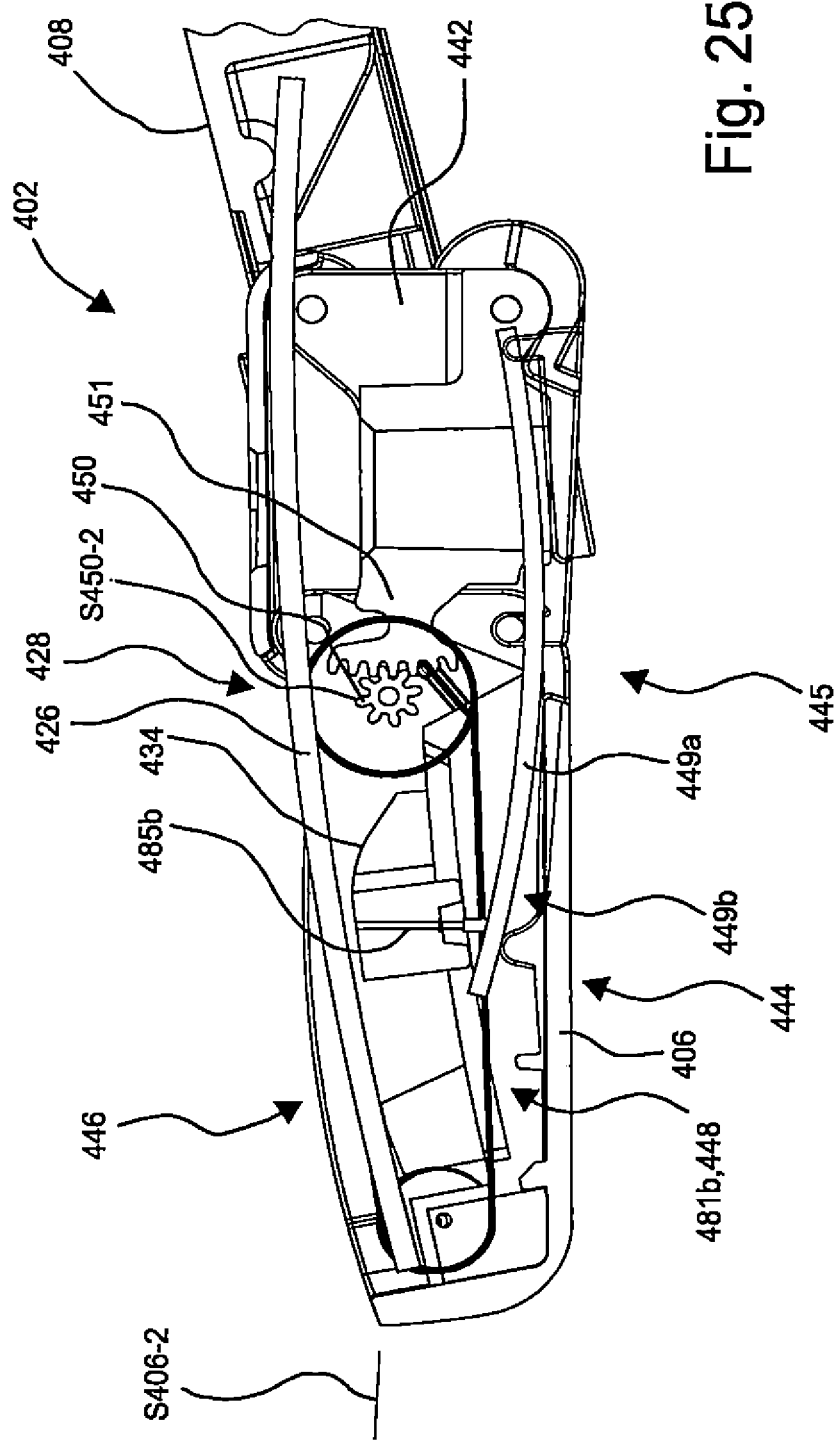
Figure 26:
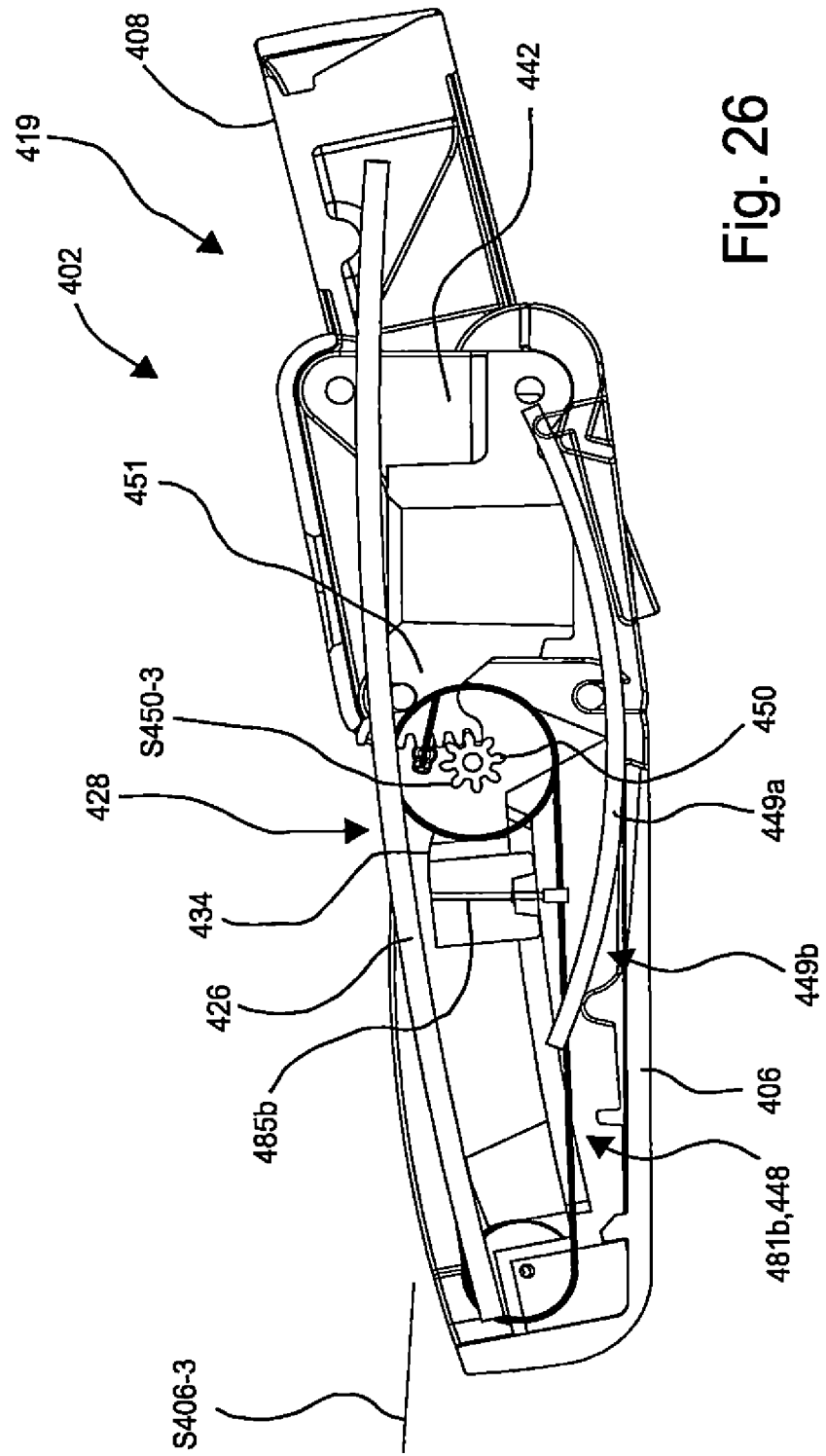
Figure 27:
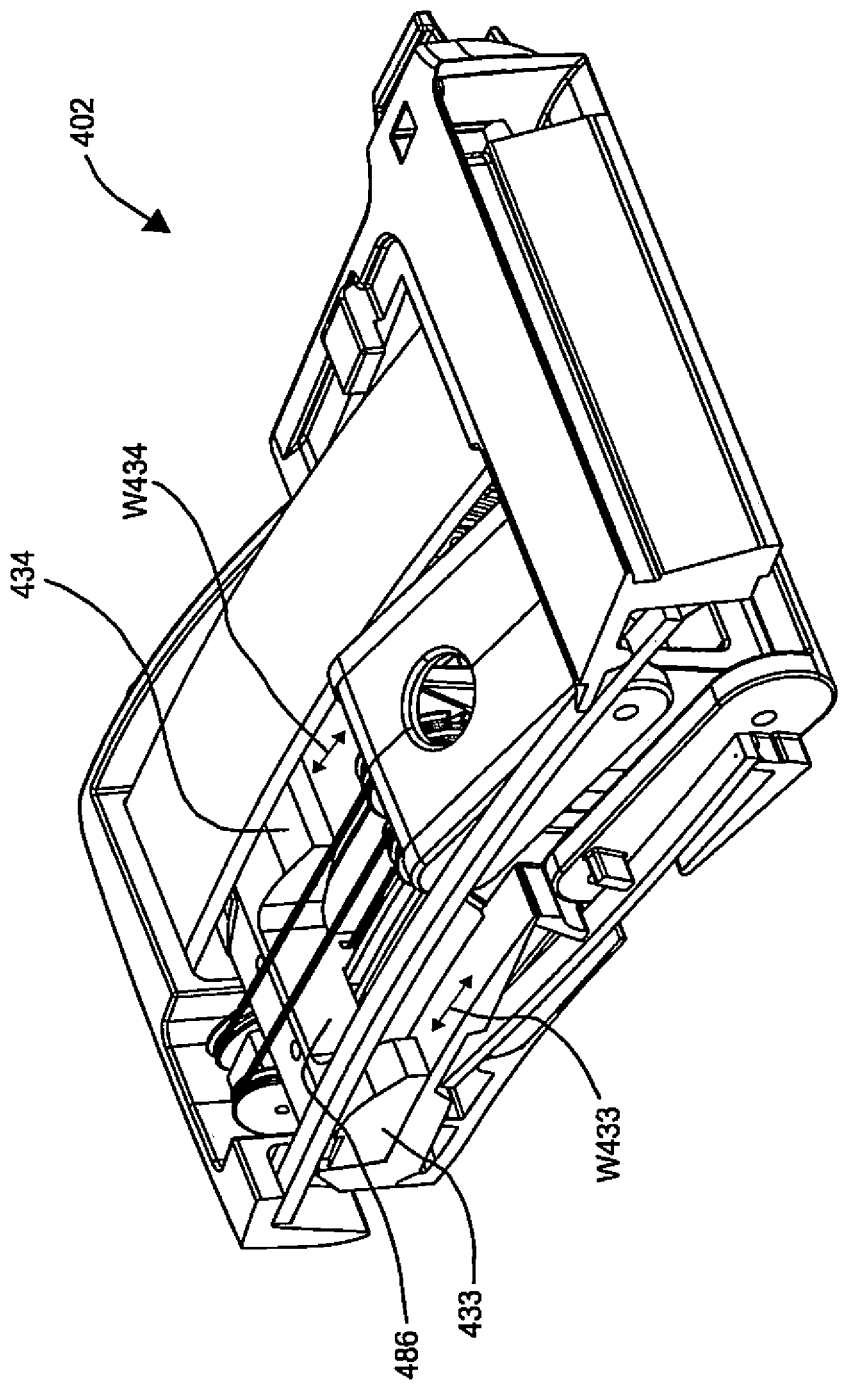
Figure 28:
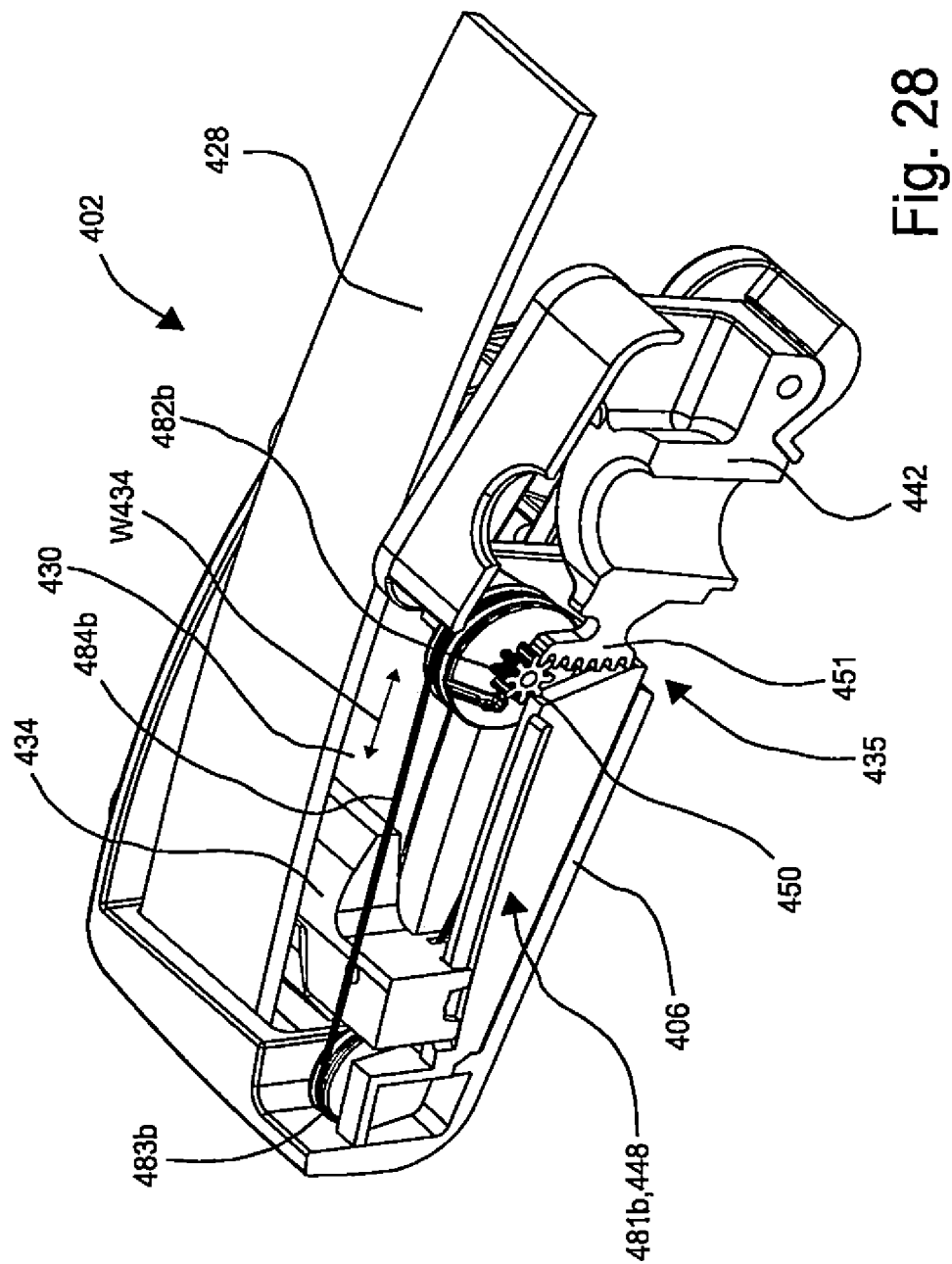
Figure 29:
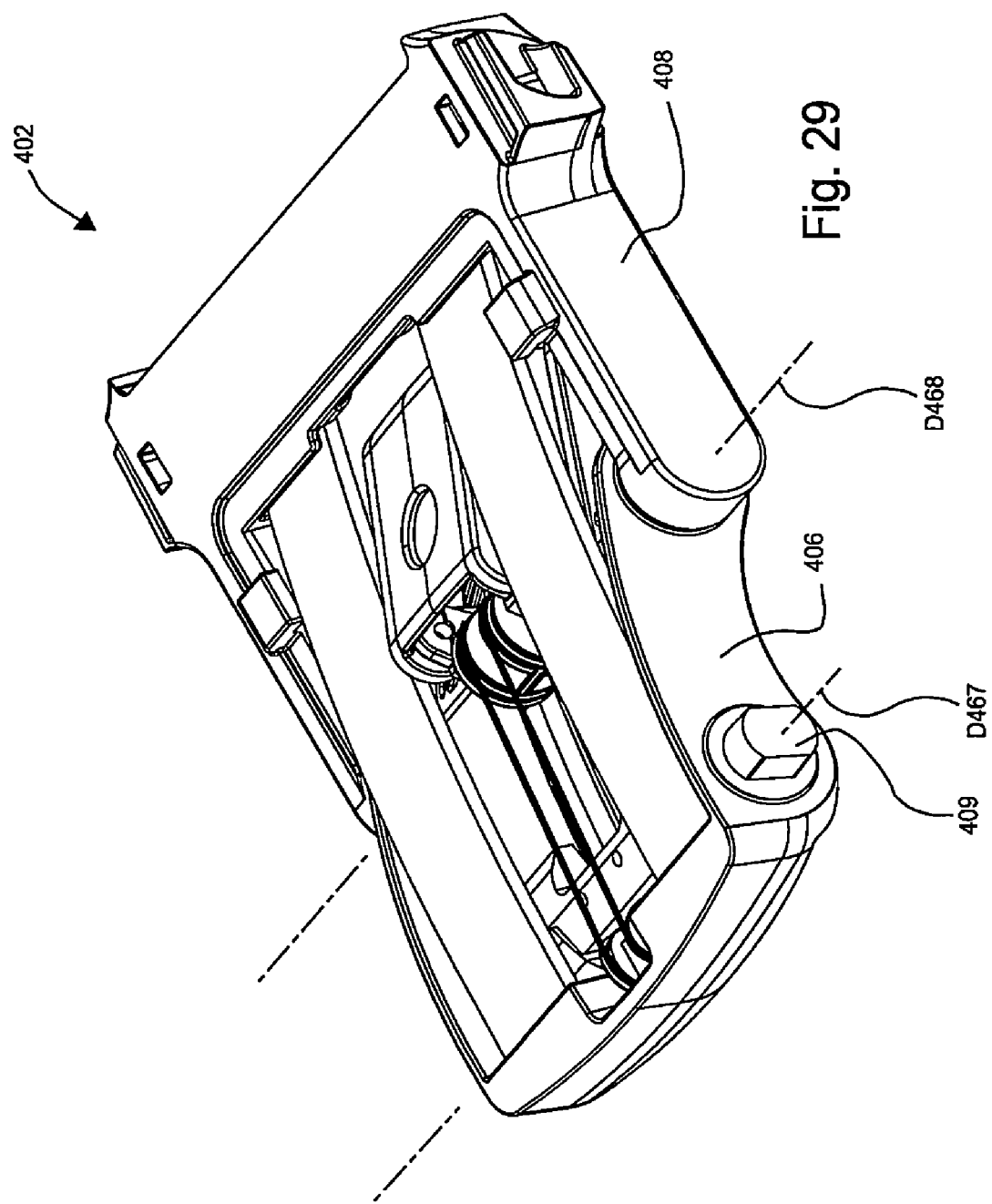

In a manner analogous to that of FIGS. 12, 13, and 14, it can be derived from a comparative observation of FIGS. 24, 25, and 26 how the belt transmissions 481a, 481b are driven by the gear wheel 450. In FIG. 24, the support 406 is in an unstressed position S406-1 which is assumed by the former when the chair is not stressed. In FIG. 25, the support 406 is in a slightly stressed position S406-2 which is assumed by the former when the chair is slightly stressed. In FIG. 26, the support 406 is in a stressed position S406-3 which is assumed by the former when the chair is more heavily stressed. It can be seen from the flexing of the leaf springs that form the weighing means that the chair is stressed by an increasingly heavier weight, wherein the leaf spring 449a in FIGS. 24 to 26 obscures the leaf spring 449b that lies behind the former.

The gear wheel 450 reaches the associated rotary positions S450-1, S450-2 or S450-3, respectively, by rotation to the left, said rotary positions by way of the belt transmissions 481a, 481b causing the entrainment elements 485a, 485b, and conjointly therewith the bearings 433 or 434, respectively, to increasingly move to the right. The entrainment elements 485a, 485b herein are fixed to the traction end of the belt 484a or 484b, respectively. Only the second belt transmission 481b is shown in each of FIGS. 24 to 26. The first belt transmission 481a functions in an identical manner.

The leaf springs 426, 427, or 428, 429, respectively, in FIGS. 23 to 29 are partially symbolized only by a geometrical solid. Furthermore, FIGS. 23 to 29 are embodied as schematic illustrations in which sectioned faces are illustrated without hatchings in order to preserve clarity.

According to a variant of embodiment that is not illustrated it is also provided that the two belt transmissions are embodied in such a manner that the latter have dissimilar gear ratios. In the case of an embodiment of this type the bearings then are not connected by a web and can move by dissimilar paths. A different gear ratio is implemented for example by way of different diameters of the second belt pulleys.

LIST OF REFERENCE SIGNS

1 Chair
2 Mechanical assembly
3 Foot element
4 Back element
5 Seat element
6 Support
7 Front swing arm
8 Rear swing arm
9, 10 Axle journal on 6
11 H-type bracket formed by 7
12-15 Leg of 11
16 Cross brace of 11
17, 18 Axle journal on 6
19 H-type bracket formed by 8
20-23 Leg of 19
24 Cross brace of 19
Appendage of 19
26 Wide internal leaf spring
26*b* Lower side of 26
27 Narrow external leaf spring
28 Wide internal leaf spring
28*b* Lower side of 26
29 Narrow external leaf spring
30 Base of 6
26*b*-29*b* Lower side of 26-29
26*c*-29*c* Second end region of 26-29
31, 32 Bearing for 27, 29 on 6
33, 34 Displaceable bearing
Adjustment mechanism
36, 37 Raceway for bearing 33 and 34, respectively
36*a* Curved face formed by 36
38 Bulkhead of 6
39 Receptacle on 6 for 26 to 29
40 Further spring element, formed by 27
41 Further spring element, formed by 29
42 Flange
43 Articulation means
43*a*, 43*b* First, second lever
44 Weighing means
45 Mechanical weighing action of 35
46 Mechanical adjustment action of 35
47 First transmission
48 Second transmission
49*a*, 49*b* Leaf spring forming weighing means 44
50 Gear wheel of 46, bearing on 50
51 Rack on 42
52 Articulated lever
52*a*, 52*b* First, second leg
53 Second gear wheel on 52*b*
54 Rack on 6
55 Rack on 34
56 Finger spring of 26, 27
56*a* Slot of 56
57 Finger spring of 28, 29
57*a* Slot of 57
86 Web
87 Guide of 33
88 Guide of 34
A45 Drive
D67 Pivot axis of 6, 7
D65 First pivot axis of 6, 5
D68 Pivot axis of 6, 8
D56 Second pivot axis of 6, 5
E33 Terminal position of 33
GLA-1-GLA-4 Articulation axis of 43
SFR6 Right side wall of the support
SFL6 Left side wall of the support
G Body weight of a person
G33 Basic position of 33
S Seat shell
R26, R28 Restoring force of 26, 28
R33 Moving space of 33
R40, R41 Restoring force of 40, 41
RG Total restoring force
W33 Path of 33
W34 Path of 34
S6-1 Unstressed position of 6
S6-2 Lightly stressed position of 6
S6-3 Comparatively heavily stressed position
S50-1 First rotary position of 50
S50-2 Second rotary position of 50
S50-3 Third rotary position of 50
ML Central longitudinal axis
SE Mirror plane
102 Mechanical assembly
106 Support
108 Rear swing arm
126 Wide internal leaf spring
126*a*, 128*a* Connection web
126-I, 128-I Width
126-II, 128-II Width
126-III, 128-III Width
127 Narrow external leaf spring
128 Wide internal leaf spring
128 Narrow external leaf spring
138 Bulkhead
139 Receptacle
A126, A128 Portion
B126, B128 Portion
202 Mechanical assembly
206 Support
208 Rear swing arm
226 Wide internal leaf spring
226-K1, 226-K2 Edge
227 Narrow external leaf spring
228 Wide internal leaf spring
228-K1, 228-K2 Edge
229 Narrow external leaf spring
238 Bulkhead
239 Receptacle
L226, L228 Longitudinal extent
L226, L228 Longitudinal extent
302 Mechanical assembly
306 Support
308 Rear swing arm
326 Wide internal leaf spring
326-K1, 326-K2 Edge
327 Narrow external leaf spring
328 Wide internal leaf spring
328-K1, 328-K2 Edge 329 Narrow external leaf spring
338 Bulkhead
339 Receptacle
D367 Rotation axis
L326, L328 Longitudinal extent
408 Rear swing arm
409, 410 Axle journal on 406
417, 418 Axle journal on 406
419 H-type bracket formed by 408
420, 421 Leg of 419
424 Cross brace of 419
426 Wide internal leaf spring
427 Narrow external leaf spring
428 Wide internal leaf spring
429 Narrow external leaf spring
430 Base of 406
426a-429a First end region of 426-429
426c-429c Second end region of 426-429
431, 432 Bearing for 427, 429 on 406
433, 434 Displaceable bearing
435 Adjustment mechanism
436, 437 Raceway for bearing 433 and 434, respectively
438 Bulkhead of 406
439 Receptacle on 406 for 426 to 429
440 Further spring element, formed by 427
441 Further spring element, formed by 429
442 Flange
443 Articulation means
443a, 443b First, second lever
444 Weighing means
445 Mechanical weighing action of 435
446 Mechanical adjustment action of 435
447 First transmission
448 Second transmission
449a, 449b Leaf spring forming weighing means 444
450 Gear wheel of 446, bearing on 450
451 Rack on 442
456a Slot
457a Slot
481a First belt transmission
482a First belt pulley
483a Second belt pulley
484a Belt
485a Entrainment element
481b Second belt transmission
482b First belt pulley
483b Second belt pulley
484b Belt
485b Entrainment element
486 Web
A445 Drive for 481a, 481b
D467 Pivot axis of 406, 407
D468 Pivot axis of 406, 408
W433, W434 Path
S406-1 Unstressed position of 406
S406-2 Slightly stressed position of 406
S406-3 Stressed position of 406
S450-1 First rotary position of 450
S450-2 Second rotary position of 450
S450-3 Third rotary position of 450

The invention claimed is:
1. A mechanical assembly for a chair,
wherein a foot element, a back element, and a seat element are articulatable on the mechanical assembly;
wherein the back element and the seat element form a seat shell;
wherein the mechanical assembly comprises a support, a front swing arm, and a rear swing arm;
wherein the front swing arm is pivotably articulated on the support and connected to the seat element;
wherein the rear swing arm is pivotably articulated on the support and connected to the seat shell;
wherein the mechanical assembly, in order to compensate for a body weight of a person seated, comprises at least one leaf spring;
wherein the mechanical assembly furthermore comprises at least one adjustable bearing, an adjustment mechanism for the bearing or the bearings, respectively, and at least one raceway for the bearing or the bearings, respectively;
wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region;
wherein the mechanical assembly comprises at least two of the leaf springs and at least two of the bearings, wherein each bearing is assigned to one of the leaf springs, wherein at least two of the bearings are displaceable below the leaf springs by way of the adjustment mechanism and are displaceable on the raceway or raceways by identical or variable paths;
wherein the front swing arm is configured as an H-shaped bracket with four legs, wherein the bracket on the first and the second leg is fastened to the support so as to be pivotable about a common rotation axis, and wherein the seat element is articulated on the third and the fourth leg so as to be pivotable about a common rotation axis.

2. The mechanical assembly as claimed in claim 1, wherein the support is directly connected to the foot element.

3. The mechanical assembly as claimed in claim 2, wherein the adjustment mechanism comprises a drive configured as a manual drive or as an electric drive, a first transmission with a first gear ratio in the form of a first reduction gearing or positive gearing, and a second transmission with a second gear ratio in the form of a second reduction gearing or positive gearing that is different from the first reduction gearing or positive gearing, wherein both transmissions are driveable by the drive, and wherein the first bearing is driveable by the first transmission and the second bearing is driveable by the second transmission.

4. The mechanical assembly as claimed in claim 2, wherein the adjustment mechanism comprises a first drive configured as a manual drive or as an electric drive, a second manual drive configured as a manual drive or as an electric drive, a first transmission and a second transmission, wherein the first transmission is driveable by the first drive, and wherein the second transmission is driveable by the second drive.

5. The mechanical assembly as claimed in claim 2, wherein the adjustment mechanism comprises a drive configured as a manual drive or as an electric drive, a clutch and a transmission, wherein the transmission is driveable by the drive, and wherein the first bearing in a first clutch position of the clutch is driveable by the transmission, and wherein the second bearing in a second clutch position of the clutch is driveable by the transmission.

6. The mechanical assembly as claimed in claim 1, wherein the seat shell, by an interconnection of the rear swing arm, is supported indirectly on the leaf spring or leaf springs.

7. A mechanical assembly for a chair,
wherein a foot element, a back element, and a seat element are articulatable on the mechanical assembly;
wherein the back element and the seat element form a seat shell;
wherein the mechanical assembly comprises a support, a front swing arm, and a rear swing arm;
wherein the front swing arm is pivotably articulated on the support and connected to the seat element;
wherein the rear swing arm is pivotably articulated on the support and connected to the seat shell;
wherein the mechanical assembly, in order to compensate for a body weight of a person seated, comprises at least one leaf spring;
wherein the mechanical assembly furthermore comprises at least one adjustable bearing, an adjustment mechanism for the bearing or the bearings, respectively, and at least one raceway for the bearing or the bearings, respectively;
wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region;
wherein the mechanical assembly comprises at least two of the leaf springs and at least two of the bearings, wherein each bearing is assigned to one of the leaf springs, wherein at least two of the bearings are displaceable below the leaf springs by way of the adjustment mechanism and are displaceable on the raceway or raceways by identical or variable paths;
wherein the rear swing arm is configured as an H-shaped bracket with four legs, wherein the bracket on the first and the second leg is fastened to the support so as to be pivotable about a common rotation axis, wherein the seat element is articulated on the third and the fourth leg so as to be pivotable about a common rotation axis, and wherein an appendage of the third and fourth leg is connected to the back element and supports the latter.

8. A mechanical assembly for a chair,
wherein a foot element, a back element, and a seat element are articulatable on the mechanical assembly;
wherein the back element and the seat element form a seat shell;
wherein the mechanical assembly comprises a support, a front swing arm, and a rear swing arm;
wherein the front swing arm is pivotably articulated on the support and connected to the seat element;
wherein the rear swing arm is pivotably articulated on the support and connected to the seat shell;
wherein the mechanical assembly, in order to compensate for a body weight of a person seated, comprises at least one leaf spring;
wherein the mechanical assembly furthermore comprises at least one adjustable bearing, an adjustment mechanism for the bearing or the bearings, respectively, and at least one raceway for the bearing or the bearings, respectively;
wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region;
wherein the mechanical assembly comprises at least two of the leaf springs and at least two of the bearings, wherein each bearing is assigned to one of the leaf springs, wherein at least two of the bearings are displaceable below the leaf springs by way of the adjustment mechanism and are displaceable on the raceway or raceways by identical or variable paths;
wherein the support is indirectly connected to the foot element, wherein the mechanical assembly in addition to the support further comprises a flange, an articulation means, and a weighing means, wherein the flange is connected to the foot element, wherein the support by way of the articulation means is articulated on the flange, wherein the support by way of the weighing means is supported on the flange.

9. The mechanical assembly as claimed in claim 8, wherein the adjustment mechanism comprises a mechanical weighing action and a mechanical adjustment action, wherein the mechanical weighing action drives the mechanical adjustment action depending on the body weight of a person seated on the seat element, and the bearings, depending on the body weight of the person seated, are simultaneously displaced by the mechanical adjustment action by variable paths along their raceway in such a manner that the seat shell is supported on the support to a degree so as to correspond to the body weight of the person seated.

10. The mechanical assembly as claimed in claim 8, wherein the weighing means comprises at least one leaf spring.

11. The mechanical assembly as claimed in claim 8, wherein the articulation means comprises two levers which are guided in parallel and which are in each case connected to the flange and the support so as to be rotatable about a total of four parallel articulation axes.

12. A mechanical assembly for a chair,
wherein a foot element, a back element, and a seat element are articulatable on the mechanical assembly;
wherein the back element and the seat element form a seat shell;
wherein the mechanical assembly comprises a support, a front swing arm, and a rear swing arm;
wherein the front swing arm is pivotably articulated on the support and connected to the seat element;
wherein the rear swing arm is pivotably articulated on the support and connected to the seat shell;
wherein the mechanical assembly, in order to compensate for a body weight of a person seated, comprises at least one leaf spring;
wherein the mechanical assembly furthermore comprises at least one adjustable bearing, an adjustment mechanism for the bearing or the bearings, respectively, and at least one raceway for the bearing or the bearings, respectively;
wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region;
wherein the mechanical assembly comprises at least two of the leaf springs and at least two of the bearings, wherein each bearing is assigned to one of the leaf springs, wherein at least two of the bearings are displaceable below the leaf springs by way of the adjustment mechanism and are displaceable on the raceway or raceways by identical or variable paths;

further comprising a further spring element or further spring elements, respectively, that is or are, respectively, configured as a leaf spring which is or are, respectively, disposed next to the adjustable leaf springs in such a manner that the additional leaf spring or the additional leaf springs, respectively, by way of a first end region is or are, respectively, likewise fixed to the support, wherein the mechanical assembly comprises stationary bearings for the further spring element or elements, respectively.

13. The mechanical assembly as claimed in claim 12, wherein in each case one additional leaf spring is connected to an adjustable leaf in the first end region, and outside the first end region said leaf springs are separated by a slot.

14. A mechanical assembly for a chair,
wherein a foot element, a back element, and a seat element are articulatable on the mechanical assembly;
wherein the back element and the seat element form a seat shell;
wherein the mechanical assembly comprises a support, a front swing arm, and a rear swing arm;
wherein the front swing arm is pivotably articulated on the support and connected to the seat element;
wherein the rear swing arm is pivotably articulated on the support and connected to the seat shell;
wherein the mechanical assembly, in order to compensate for a body weight of a person seated, comprises at least one leaf spring;
wherein the mechanical assembly furthermore comprises at least one adjustable bearing, an adjustment mechanism for the bearing or the bearings, respectively, and at least one raceway for the bearing or bearings, respectively;
wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region;
wherein the support is indirectly connected to the foot element, wherein the mechanical assembly in addition to the support further comprises a flange, an articulation means, and a weighing means, wherein the flange is connected to the foot element, wherein the support by way of the articulation means is articulated on the flange, wherein the support by way of the weighing means is supported on the flange;
wherein the adjustment mechanism comprises a mechanical weighing action and a mechanical adjustment action, wherein the mechanical weighing action drives the mechanical adjustment action depending on the body weight of a person seated on the seat element, and the bearings, depending on the body weight of the person seated, are simultaneously displaced by the mechanical adjustment action by variable paths along their raceway in such a manner that the seat shell is supported on the support to a degree so as to correspond to the body weight of the person seated;
wherein the flange comprises a rack, wherein the rack drives a first transmission which acts on the first displaceable bearing and a second transmission which acts on the second displaceable bearing, and
wherein either each transmission comprises an articulated lever, wherein the articulated lever comprises a first leg and a second leg, wherein the two legs are connected in an articulated manner, wherein the first articulated lever at its free end is pivoted and the second articulated lever at its free end rotatably holds a gear wheel which is positioned in such a manner between a rack which is connected to the support and a rack which is disposed on the bearing that rolling of the gear wheel on the rack which is implemented on the support leads to a relative movement between the gear wheel and the bearing in that the bearing is conveyed by the rotation and the linear movement of the gear wheel;

or each transmission is configured as a belt transmission and comprises a first belt pulley, a second belt pulley, a belt, and an entrainment element, wherein the first bearing is movable by the entrainment element of the first belt transmission, and wherein the second bearing is movable by the entrainment element of the second belt transmission.

15. The mechanical assembly as claimed in claim 14, wherein the first and the second transmission have identical gear ratios in the form of reduction gearings or positive gearings or have different gear ratios in the form of reduction gearings or positive gearings.

16. The mechanical assembly as claimed in claim 15, wherein the leaf springs in terms of the width thereof in a portion adjacent to the receptacle taper off towards the receptacle in a portion that follows the adjacent portion and is remote from the receptacle have a consistent width.

17. A mechanical assembly for a chair,
wherein a foot element, a back element, and a seat element are articulatable on the mechanical assembly;
wherein the back element and the seat element form a seat shell;
wherein the mechanical assembly comprises a support, a front swing arm, and a rear swing arm;
wherein the front swing arm is pivotably articulated on the support and connected to the seat element;
wherein the rear swing arm is pivotably articulated on the support and connected to the seat shell;
wherein the mechanical assembly, in order to compensate for a body weight of a person seated, comprises at least one leaf spring;
wherein the mechanical assembly furthermore comprises at least one adjustable bearing, an adjustment mechanism for the bearing or the bearings, respectively, and at least one raceway for the bearing or the bearings, respectively;
wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region;
wherein the mechanical assembly comprises at least two of the leaf springs and at least two of the bearings, wherein each bearing is assigned to one of the leaf springs, wherein at least two of the bearings are displaceable below the leaf springs by way of the adjustment mechanism and are displaceable on the raceway or raceways by identical or variable paths;
wherein the leaf springs taper off towards a receptacle in which said leaf springs are clamped.

18. A mechanical assembly for a chair,
wherein a foot element, a back element, and a seat element are articulatable on the mechanical assembly;
wherein the back element and the seat element form a seat shell;

wherein the mechanical assembly comprises a support, a front swing arm, and a rear swing arm;

wherein the front swing arm is pivotably articulated on the support and connected to the seat element;

wherein the rear swing arm is pivotably articulated on the support and connected to the seat shell;

wherein the mechanical assembly, in order to compensate for a body weight of a person seated, comprises at least one leaf spring;

wherein the mechanical assembly furthermore comprises at least one adjustable bearing, an adjustment mechanism for the bearing or the bearings, respectively, and at least one raceway for the bearing or the bearings, respectively;

wherein the leaf spring or the leaf springs, respectively, by way of a first end region in each case is or are fixed, respectively, to the support, in each case bears on the bearing or bear on the bearings, respectively, outside the end region, and in each case supports or support, respectively, the seat shell outside the end region;

wherein the mechanical assembly comprises at least two of the leaf springs and at least two of the bearings, wherein each bearing is assigned to one of the leaf springs, wherein at least two of the bearings are displaceable below the leaf springs by way of the adjustment mechanism and are displaceable on the raceway or raceways by identical or variable paths;

wherein a drive comprises a rack which is disposed on a flange and a gear wheel rotatably mounted on the support, wherein the support in relation to the flange is movable in such a manner that the gear wheel in the case of a movement of the support rolls on the rack.

* * * * *